(12) United States Patent
Schultz et al.

(10) Patent No.: US 10,521,049 B2
(45) Date of Patent: Dec. 31, 2019

(54) MULTI-VIA STRUCTURES FOR TOUCHSCREENS

(71) Applicant: Apple Inc., Cupertino, CA (US)

(72) Inventors: David Sheldon Schultz, Berkeley, CA (US); Prithu Sharma, Cupertino, CA (US); Zachary M. Gaubert, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/144,911

(22) Filed: Sep. 27, 2018

(65) Prior Publication Data

US 2019/0102011 A1    Apr. 4, 2019

Related U.S. Application Data

(60) Provisional application No. 62/565,531, filed on Sep. 29, 2017.

(51) Int. Cl.
  *G06F 3/041* (2006.01)
  *G06F 3/044* (2006.01)
(52) U.S. Cl.
  CPC .......... *G06F 3/04164* (2019.05); *G06F 3/044* (2013.01); *G06F 3/0412* (2013.01);
  (Continued)
(58) Field of Classification Search
  CPC ......... G06F 3/044–0448; G06F 3/0416–04186
  See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 104461102 A | * | 3/2015 |
| JP | 2000-163031 A | | 6/2000 |

(Continued)

OTHER PUBLICATIONS

International Search Report dated Dec. 19, 2018, for PCT Application No. PCT/US2018/053248, five pages.

(Continued)

*Primary Examiner* — Patrick F Marinelli
(74) *Attorney, Agent, or Firm* — Kubota & Basol LLP

(57) ABSTRACT

The disclosure relates to a touch screen including a first electrode layer, a second electrode layer, and a third electrode layer. The touch screen can include shield-sensor vias connecting the first electrode layer and the second electrode layer and shield-shield vias connecting the first electrode layer and the third electrode layer, for example. The shield-sensor vias can be placed in a bond pad region of the touch screen, which can further include connections between one or more routing traces connected to one or more touch electrodes and touch or other circuitry further included in the electronic device. The shield-shield vias can be placed in an outer region located around an inner region of the touch screen. In some examples, one or more routing traces can include diverted portions to maintain a threshold distance between the routing traces and the one or more shield-shield vias.

31 Claims, 26 Drawing Sheets

(52) U.S. Cl.
CPC .......... *G06F 3/0416* (2013.01); *G06F 3/0443* (2019.05); *G06F 3/0445* (2019.05); *G06F 2203/04103* (2013.01); *G06F 2203/04107* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,890,830 B2 * | 11/2014 | Choi | G06F 3/041 345/156 |
| 9,104,283 B2 * | 8/2015 | Roziere | G06F 3/0418 |
| 9,542,054 B2 * | 1/2017 | Liu | G06F 3/0412 |
| 9,958,997 B2 * | 5/2018 | Nurmi | G06F 3/044 |
| 10,120,520 B2 * | 11/2018 | Krah | G02F 1/13338 |
| 10,318,031 B2 * | 6/2019 | Choi | G06F 3/0412 |
| 2006/0197753 A1 | 9/2006 | Hotelling | |
| 2014/0028582 A1 * | 1/2014 | Choi | G06F 3/041 345/173 |
| 2014/0132335 A1 * | 5/2014 | Rauhala | G06F 3/044 327/517 |
| 2015/0035792 A1 * | 2/2015 | Roziere | G06F 3/0418 345/174 |
| 2015/0160767 A1 * | 6/2015 | Song | G06F 3/0412 345/174 |
| 2015/0346853 A1 * | 12/2015 | Liu | G06F 3/0412 345/174 |
| 2016/0209962 A1 * | 7/2016 | Nurmi | G06F 3/044 |
| 2016/0283000 A1 * | 9/2016 | Wang | G06F 3/041 |
| 2017/0003792 A1 | 1/2017 | Berget et al. | |
| 2017/0090652 A1 * | 3/2017 | Sato | G06F 3/0416 |
| 2017/0123574 A1 * | 5/2017 | Inagaki | G06F 3/0412 |
| 2017/0192610 A1 * | 7/2017 | Park | G02F 1/136286 |
| 2017/0277320 A1 * | 9/2017 | Choi | G06F 3/0412 |
| 2017/0371464 A1 * | 12/2017 | Nakanishi | G06F 3/0412 |
| 2018/0032176 A1 * | 2/2018 | Krah | G02F 1/13338 |
| 2018/0046274 A1 * | 2/2018 | Xie | G06F 3/044 |
| 2018/0088717 A1 * | 3/2018 | Chen | G02F 1/13338 |
| 2018/0292698 A1 * | 10/2018 | Koide | G09G 3/3648 |
| 2018/0329549 A1 * | 11/2018 | Miyamoto | G06F 3/044 |
| 2019/0056834 A1 * | 2/2019 | Blondin | G06F 3/0412 |
| 2019/0073061 A1 * | 3/2019 | Krah | G02F 1/13338 |
| 2019/0102011 A1 * | 4/2019 | Schultz | G06F 3/0412 |
| 2019/0237533 A1 * | 8/2019 | Kim | H01L 27/3276 |

FOREIGN PATENT DOCUMENTS

| | | |
|---|---|---|
| JP | 2002-342033 A | 11/2002 |
| WO | 2019067806 A1 | 4/2019 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MULTI-VIA STRUCTURES FOR TOUCHSCREENS

CROSS REFERENCE TO RELATED APPLICATIONS

This application claims the benefit under 35 USC 119(e) of U.S. Provisional Patent Application No. 62/565,531, filed Sep. 29, 2017 and the contents of which are incorporated herein by reference in their entirety for all purposes.

FIELD OF DISCLOSURE

This relates to a touch screen including a plurality of electrode layers, and more particularly, to a touch screen comprising a stackup including a plurality of electrode layers electrically coupled together using one or more types of vias.

BACKGROUND OF THE DISCLOSURE

Many types of input devices are presently available for performing operations in a computing system, such as buttons or keys, mice, trackballs, joysticks, touch sensor panels, touch screens, and the like. Touch screens, in particular, are popular because of their ease and versatility of operation as well as their declining price. Touch screens can include a touch sensor panel, which can be a transparent panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus, or other touch object at a location often dictated by a user interface (UI) being displayed by the display device. In general, touch screens can recognize a touch and the position of the touch on the touch sensor panel. The computing system can interpret the touch in accordance with one or more display images appearing at the time of the touch. The touch screen can perform one or more actions based on the touch. In the case of some touch screens, a physical touch on the display may not be needed to detect a touch. For example, in some capacitive-type touch screens, fringing electrical fields used to detect touch can extend beyond the surface of the display, and an touch object approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In order to detect such changes, in some examples, the touch electrodes can be coupled to sense circuitry using routing traces. It is due in part to their substantial transparency that some capacitive touch sensor panels can be overlaid on a display to form a touch screen. Some touch screens can be formed by at least partially integrating touch sensing circuitry into a display pixel stackup (i.e., a stack of material layers forming the display pixels). In some examples, touch screens can further include one or more shielding electrodes for mitigating the capacitive coupling of electrical noise to one or more touch sensing components (e.g., touch electrodes or routing traces) of the touch screen. The shielding electrodes can be located on the same layer or on different layers from the touch electrodes and/or routing traces and can receive a same or different signal from the signal applied to the touch electrodes (e.g., by way of routing traces) to sense a touch.

BRIEF SUMMARY OF THE INVENTION

This relates to a touch screen including a plurality of electrode layers and to a touch screen whose stackup can include a plurality of electrode layers electrically coupled together using one or more types of vias. In some examples, the touch screen can include a top shielding layer, a touch sensing layer, and a bottom shielding layer. In some examples, the top shielding layer, the bottom shielding layer, and one or more electrodes located on the touch sensing layer can be driven with one or more electrical signals to mitigate unwanted capacitive coupling to one or more electronic components (e.g., the touch electrodes and/or one or more routing traces). The top shielding layer and the touch sensing layer can be electrically coupled by one or more shield-sensor vias, for example. In some examples, the top shielding layer and the bottom shielding layer can be coupled by one or more shield-shield vias. In this way, the top shielding layer, the touch sensing layer, and the bottom shielding layer can be electrically coupled together so that the three layers can be driven with the same electric potential.

The different types of vias can be located in regions of the touch screen based on the exposure of electrode layers such that an endcap (e.g., a part of a via in contact with a surface of an electrode layer), included in the via, can make electrical contact with the respective electrode layer. For example, a shield-sensor via can be located in a region (e.g., a bond pad region) where the top shielding and touch layers are both exposed. A shield-shield via can be located in a different region (e.g., an edge region or a border region) where the top and bottom shielding layers are exposed. The touch screen can include on or more opaque masks to reduce the visibility of electronic components (e.g., routing traces). To reduce the visibility of the vias, the vias can be further located in areas covered by an opaque mask. In some examples, the touch screen can include one or more passivation layers to reduce or prevent corrosion of the vias.

DETAILED DESCRIPTION OF THE INVENTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a touch screen including a plurality of electrode layers and to a touch screen whose stackup can include a plurality of electrode layers electrically coupled together using one or more types of vias. In some examples, the touch screen can include a top shielding layer, a touch sensing layer, and a bottom shielding layer. In some examples, the top shielding layer, the bottom shielding layer, and one or more electrodes located on the touch sensing layer can be driven with one or more electrical signals to mitigate unwanted capacitive coupling to one or more electronic components (e.g., the touch electrodes and/or one or more routing traces). The top shielding layer and the touch sensing layer can be electrically coupled by one or more shield-sensor vias, for example. In some examples, the top shielding layer and the bottom shielding layer can be coupled by one or more shield-shield vias. In this way, the top shielding layer, the touch sensing layer, and the bottom shielding layer can be electrically coupled together so that the three layers can be driven with the same electric potential.

The different types of vias can be located in regions of the touch screen based on the exposure of electrode layers such that an endcap (e.g., a part of a via in contact with a surface of an electrode layer), included in the via, can make electrical contact with the respective electrode layer. For example, a shield-sensor via can be located in a region (e.g., a bond pad region) where the top shielding and touch layers are both exposed. A shield-shield via can be located in a different region (e.g., an edge region or a border region) where the top and bottom shielding layers are exposed. The touch screen can include on or more opaque masks to reduce the visibility of electronic components (e.g., routing traces). To reduce the visibility of the vias, the vias can be further located in areas covered by an opaque mask. In some examples, the touch screen can include one or more passivation layers to reduce or prevent corrosion of the vias.

FIGS. 1A-1D illustrate an example mobile telephone 136, an example media player 140, an example personal computer 144, and an example tablet computer 148 that can each include an exemplary touch screen 124-128 according to examples of the disclosure.

Figure 1A:
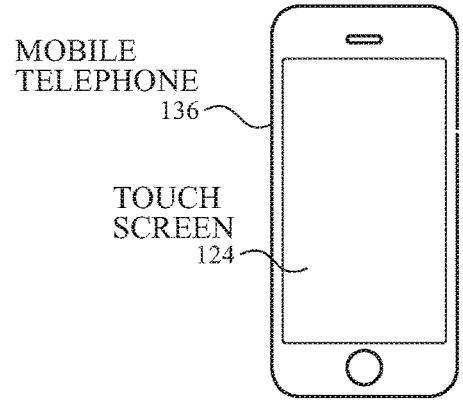
FIGS. 1A-1D illustrate an example mobile telephone, an example media player, an example personal computer, and an example tablet computer that can each include an exemplary touch screen according to examples of the disclosure.
Figure 1B:
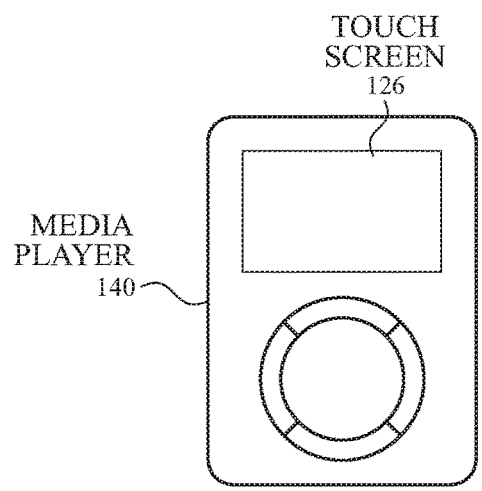
Figure 1C:
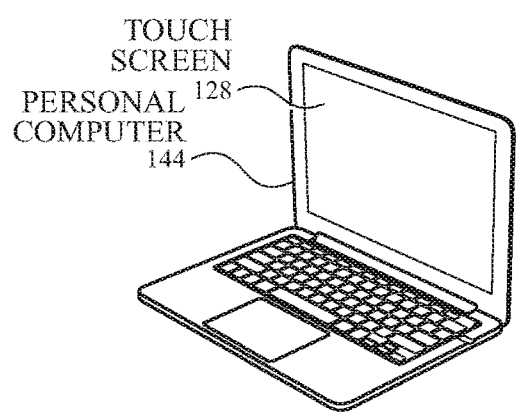
Figure 1D:
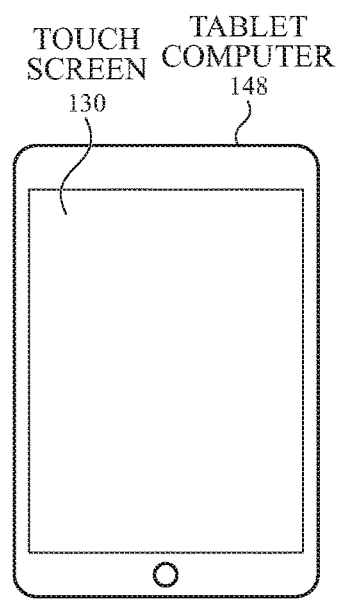

FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128, and 130 can be based on self-capacitance. A self-capacitance-based touch system can include a matrix of small, individual plates of conductive material that can be referred to as touch electrodes (as described below with reference to touch screen 220 in FIG. 2 and with reference to touch screen 402 in FIG. 4B). For example, a touch screen can include a plurality of individual touch electrodes, where each touch electrode can identify or represent a unique location on the touch screen at which touch or proximity (i.e., a touch or proximity event) can be sensed. In some instances, one or more touch electrodes can be electrically isolated from other touch electrodes in the touch screen. Such a touch screen can be referred to as a pixelated self-capacitance touch screen, though it is understood that, in some examples, the touch electrodes on the touch screen can be used to perform scans other than self-capacitance scans on the touch screen (e.g., mutual capacitance scans). During operation, a touch electrode can be stimulated with an AC waveform, and the self-capacitance to ground of the touch electrode can be measured. As a touch object approaches the touch electrode, the self-capacitance to ground of the touch electrode can change (e.g., increase). This change in the self-capacitance of the touch electrode can be detected and measured by the touch screen to determine the positions of multiple touch objects when they touch, or come in proximity to, the touch screen. In some examples, the touch electrodes of a selfcapacitance-based touch system can be formed from rows and columns of conductive material (as described below with reference to touch screen 400 in FIG. 4A), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, and 130 can be based on mutual capacitance. A mutual capacitance-based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As a touch object approaches the touch node, the mutual capacitance of the touch node can change (e.g., decrease). This change in the mutual capacitance of the touch node can be detected and measured by the touch screen to determine the positions of multiple touch objects when they touch or come in proximity to, the touch screen. Although examples of touch screens are described herein, it should be understood that some examples can include touch sensor panels associated with a display screen (e.g., touch sensitive displays) or not associated with a display screen (e.g., trackpads) without departing from the scope of the disclosure. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material (e.g., as in touch screen 402 in FIG. 4B) or as drive lines and sense lines (e.g., as in touch screen 400 in FIG. 4B), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
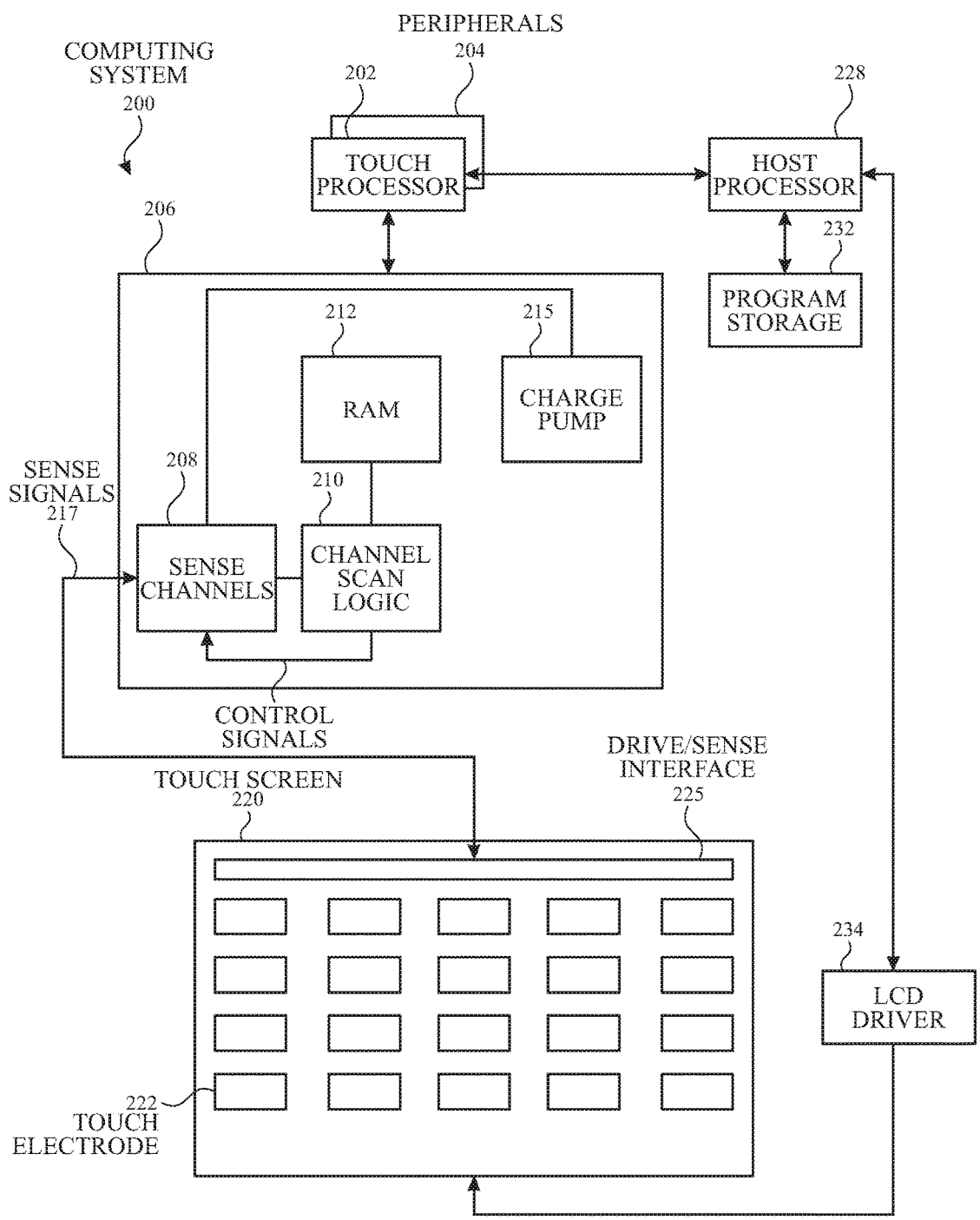
FIG. 2 illustrates a block diagram of an example computing system that illustrates one implementation of an example self-capacitance touch screen according to examples of the disclosure.

FIG. 2 illustrates a block diagram of an example computing system 200 that illustrates one implementation of an example self-capacitance touch screen 220 according to examples of the disclosure. It is understood that computing system 200 can include a mutual capacitance touch screen, as described above, though the examples of the disclosure will be described in the context of a self-capacitance touch screen. Computing system 200 can be included in, for example, mobile telephone 136, digital media player 140, personal computer 144, tablet computer 148, or any mobile or non-mobile computing device that includes a touch screen such as a wearable device. Computing system 200 can include a touch screen including one or more touch processors 202, peripherals 204, a touch controller 206, and touch sensing circuitry (described in more detail below). Peripherals 204 can include, but are not limited to, random access memory (RAM) or other types of memory or storage, watchdog timers, and the like. Touch controller 206 can include, but is not limited to, one or more sense channels 208 and channel scan logic 210. Channel scan logic 210 can access RAM 212, autonomously read data from sense channels 208, and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202, and peripherals 204 can be integrated into a single application specific integrated circuit (ASIC), and in some examples, can be integrated within touch screen 220 itself.

Touch screen 220 can be used to derive touch information at multiple discrete locations of the touch screen, referred to herein as touch nodes. For example, touch screen 220 can include touch sensing circuitry that can include a capacitive sensing medium having a plurality of electrically isolated touch node electrodes 222 (e.g., a plurality of touch node electrodes of pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen). In such examples, each touch node electrode in a pixelated self-capacitance touch screen can be sensed for the corresponding touch node represented in the touch image.

Computing system 200 can also include a host processor 228 for receiving outputs from touch processor 202 and performing actions based on the outputs. For example, host processor 228 can be connected to program storage 232 and a display controller, such as an LCD driver 234 (or an LED display or OLED display driver). The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an touch object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Figure 3A:
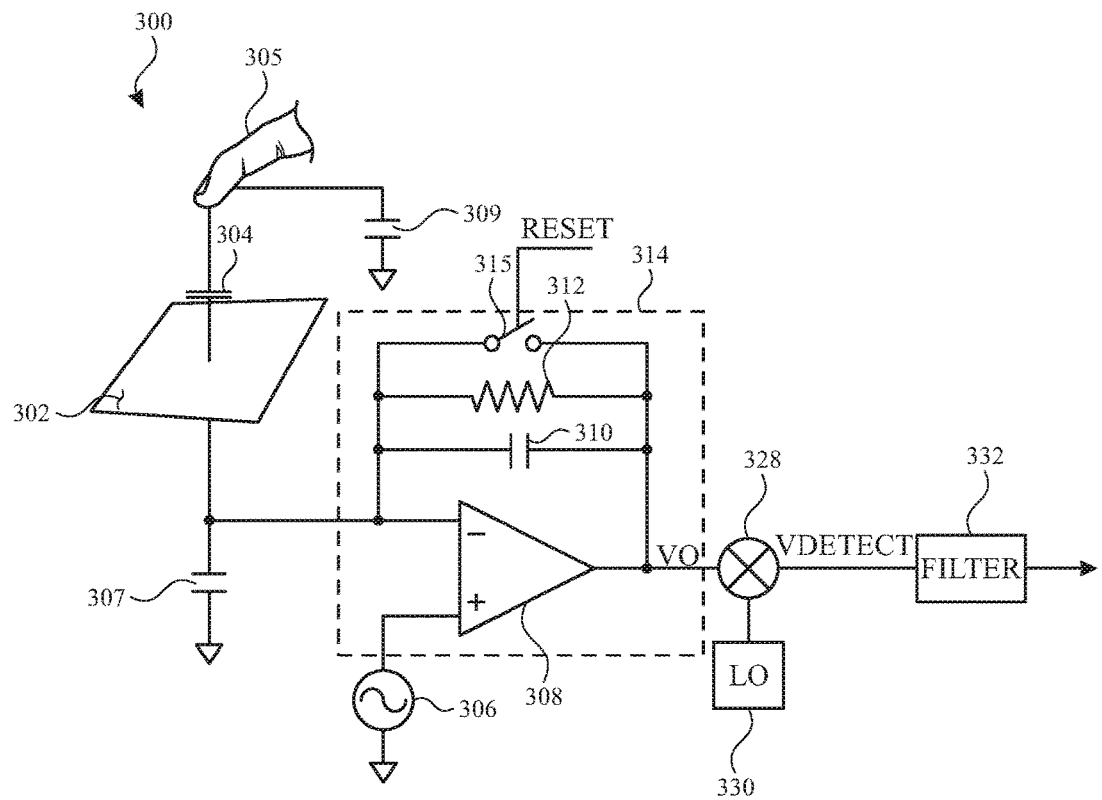
FIG. 3A illustrates an exemplary touch sensor circuit corresponding to a self-capacitance touch electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
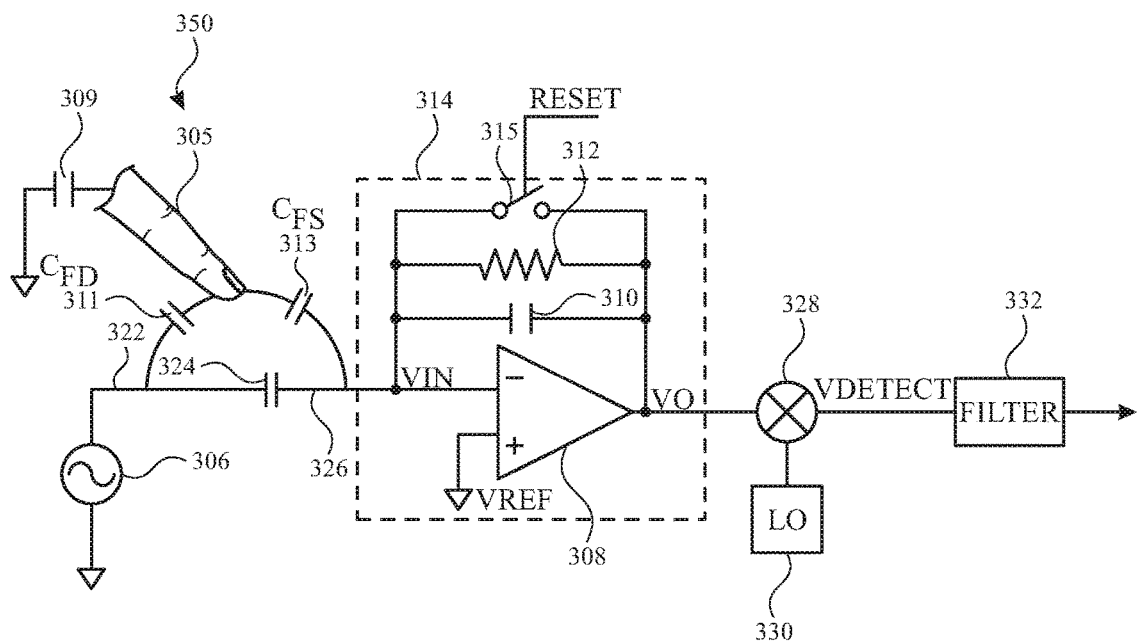
FIG. 3B illustrates an exemplary touch sensor circuit corresponding to a mutual-capacitance drive and sense lines and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
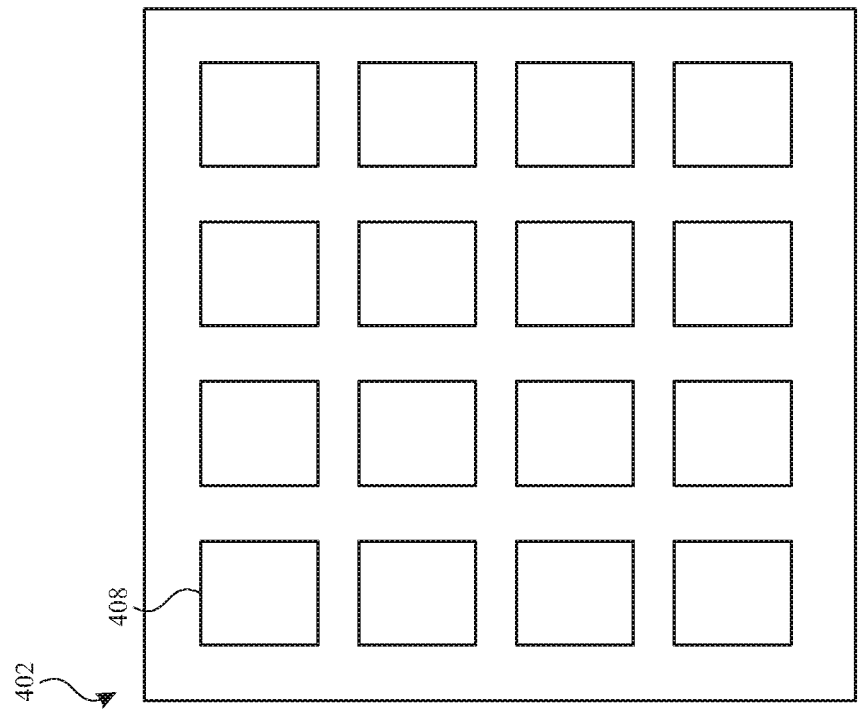
FIG. 4B illustrates a top view of an exemplary touch screen including touch electrodes arranged in a pixelated touch electrode configuration according to examples of the disclosure.
Figure 4A:
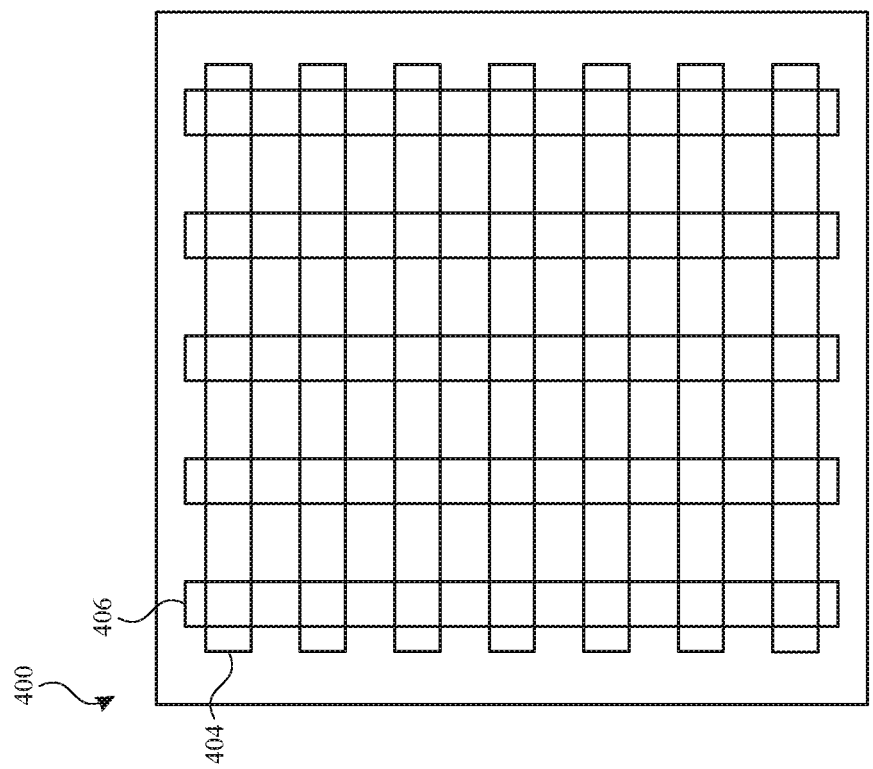
FIG. 4A illustrates a top view of an exemplary touch screen including touch electrodes arranged in rows and columns according to examples of the disclosure.

FIG. 4A illustrates a top view of an exemplary touch screen 400 including touch electrodes 404 and 406 arranged in rows and columns according to examples of the disclosure. Touch screen 400 can include a plurality of touch electrodes 404 configured as rows, and a plurality of touch electrodes 406 configured as columns. Touch electrodes 404 and/or touch electrodes 406 can include a transparent conductive material (e.g., ITO, AZO, indium-doped cadmium-oxide, or barium stannite). Touch electrodes 404 and touch electrodes 406 can be on the same or different material layers on touch screen 400 and can intersect with each other, as illustrated in FIG. 4A. In some examples, touch screen 400 can sense the self-capacitance of touch electrodes 404 and 406 to detect touch and/or proximity activity on touch screen 400. In some examples, touch screen 400 can sense the mutual capacitance between touch electrodes 404 and 406 to detect touch and/or proximity activity on touch screen 400.

FIG. 4B illustrates a top view of an exemplary touch screen 402 including touch electrodes 408 arranged in a pixelated touch electrode configuration according to examples of the disclosure. Touch screen 402 can include a plurality of touch electrodes 408 that can each identify or represent a unique location on the touch screen at which touch or proximity (i.e., a touch or proximity event) can be sensed. One or more touch electrodes can be electrically isolated from other touch electrodes in the touch screen, as previously described. In some examples, touch electrodes 408 can include a conductive material (e.g., ITO, AZO, indium-doped cadmium-oxide, or barium stannite). Touch electrodes 408 can be on the same or different material layers on touch screen 402. In some examples, touch screen 402 can sense the self-capacitance of touch electrodes 408 to detect touch and/or proximity activity on touch screen 402. In some examples, touch screen 402 can sense the mutual capacitance between touch electrodes 408 to detect touch and/or proximity activity on touch screen 402.

Touch electrodes, such as touch electrodes 404 and 406 in FIG. 4A and touch electrodes 408 in FIG. 4B, can be susceptible to external noise that can affect the sensitivity of the touch screen 400 or 402 detecting touch and/or proximity activity. Additionally, touch electrodes may be coupled to routing traces, which may be susceptible to external noise. Such external noise can originate from below the touch screen (for example, from a display in a touch screen) and/or from above the touch screen (for example, from capacitive coupling between a routing trace and the environment external to the touch sensor). Routing traces, for example, may be susceptible to capacitive coupling caused by contact between a touch object and the routing traces, which can manifest as a false touch reading (e.g., noise) detected at the touch electrode(s) corresponding to the routing trace. In some instances, it may be desirable to provide shielding from such noise sources above the touch screen ("top shielding") and/or below the touch screen ("bottom shielding"). For example, noise sources above the touch screen can include noise sources above a cover material of a device including the touch screen and noise sources below the touch screen can include noise sources within the electronic device under (e.g., on a side of the touch screen opposite the cover material) the touch screen and/or noise sources external to the device proximate to an outer casing of the device.

Figure 5A:
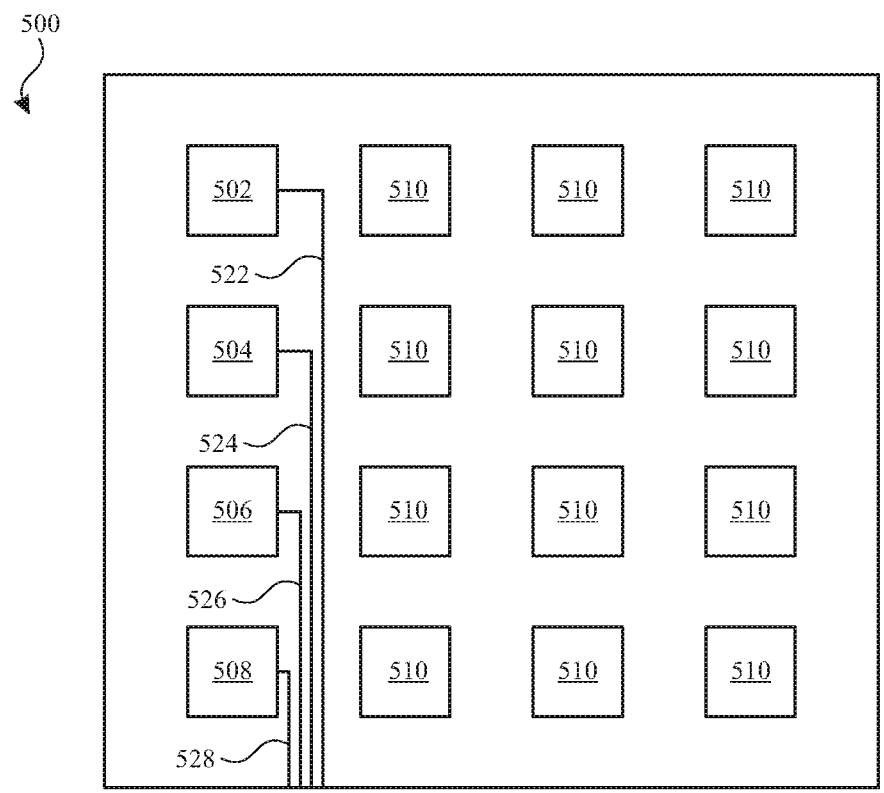
FIG. 5A illustrates a top view of an exemplary touch sensing layer included in a touch screen according to examples of the disclosure.

FIG. 5A illustrates a top view of an exemplary touch sensing layer included in a touch screen 500 according to examples of the disclosure. As shown in FIG. 5A, in some examples, touch sensing layer of touch screen 500 can include a plurality of touch electrodes 502-510. Touch electrodes 502-508 can be coupled to routing traces 522-528, for example. Although touch electrodes 510 are not illustrated as being coupled to routing traces, it should be understood that in some examples, they may be.

Touch electrodes 502-510 and routing traces 522-528 can include a transparent conductive material, such as ITO, AZO, indium-doped cadmium-oxide, or barium stannite for example. In some examples, other materials are possible and touch electrodes 502-510 need not include the same material as routing traces 522-528. Routing traces 522-528 can route one or more electrical signals indicative of the self-capacitance of the touch electrodes 502-508, for example. In some examples, these signals can be received (e.g., by touch circuitry 300 or 350) to determine whether a touch object is proximate to or touching the touch screen 500.

Figure 5B:
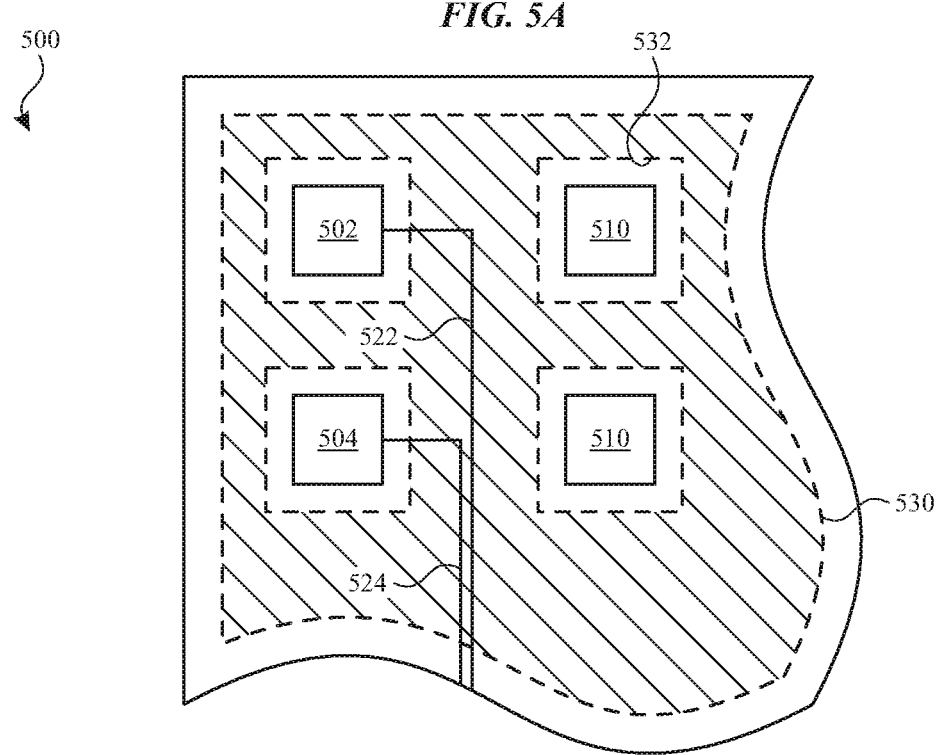
FIG. 5B illustrates a top view of a section of an exemplary top shielding electrode on top of a touch sensing layer included in a touch screen according to examples of the disclosure.

FIG. 5B illustrates a top view of a section of an exemplary top shielding electrode 530 on top of a touch sensing layer included in a touch screen 500 according to examples of the disclosure. Touch screen 500 can include touch electrodes 502-510, routing traces 522-524, and top shielding electrode 530. Touch electrodes 502 and 504 can be coupled to routing traces 522-524, respectively. Although touch electrodes 510 are not illustrated as being coupled to routing traces, it should be understood that in some examples, they may be. Top shielding electrode 530 can be located on a layer on top (e.g., closer to a cover material such as cover material 890 illustrated in FIG. 8) of touch electrodes 502-510 and routing traces 522-524. In some examples, top shielding electrode 530 may be included in a layer (e.g., first electrode layer 910 illustrated in FIGS. 9A-9B) located between a cover material (e.g., cover material 890 illustrated in FIG. 8) and the touch sensing layer (e.g., second electrode layer 920 illustrated in FIGS. 9A-9B).

In some examples, top shielding electrode 530 can include one or more openings 532 that overlap with at least portions of the touch electrodes 502-510. The non-overlapping openings 532 can prevent or reduce any impact the top shielding electrode 530 may otherwise have on the capacitive coupling between a touch object and the top electrodes 502-510. In the absence of such openings 532 (e.g., the top shielding electrode 530 includes material at locations that overlap with the touch electrodes), top shielding electrode 530 can reduce the sensitivity of touch electrodes 502-510. In some examples, top shielding electrode 530 can include portions of material that overlap with routing traces 522-524, thereby shielding routing traces 522-524 from noise sources that may cause unwanted capacitive coupling and/or inadvertent capacitive coupling to a touch object. In some instances, the touch electrodes 502-510 may not overlap with any portion of the top shielding electrode 530, as illustrated in FIG. 5B. Additionally or alternatively, the top shielding electrode 530 can fully or partially overlap routing traces 522-524, as illustrated in FIGS. 6B-6C below. In some examples, openings 532 and/or touch electrodes 502-510 can be patterned into other shapes, such as rectangles, circles, diamonds, etc.

In some examples, as mentioned above, the touch screen 500 can further include a plurality of shielding layers. For example, the plurality of shielding layers can include a bottom shielding electrode (e.g., second shielding electrode 632 illustrated in FIGS. 6B-6C). The bottom shielding electrode may be placed beneath the top shielding electrode 530 (e.g., first shielding electrode 612 illustrated in FIGS. 6B-6C), the touch electrodes 502-510, and the routing traces 522-524. That is, the touch electrodes 502-510 and routing traces 522-524 can be located between a cover material and the bottom shielding electrode.

During operation, top shielding electrode 530 and the bottom shielding electrode can receive one or more voltage signals to mitigate unwanted capacitive coupling onto routing traces 522-524 and/or touch electrodes 502-510, for example. In some examples, the one or more voltage signals can comprise the same voltage signal (e.g., from voltage source 306 illustrated in FIGS. 3A-3B) applied to the touch sensing circuitry (e.g., touch sensing circuitry 300 or 350 illustrated in FIGS. 3A-3B). In some instances, two or more of top shielding electrode 530, the bottom shielding, one or more of the touch electrodes 502-510, and the routing traces 522-524 can be electrically coupled together so that the coupled conductive elements can have the same electric potential. For example, one or more of touch electrodes 502-510 and the top shielding electrode 530 can be driven to the same electric potential by way of the coupled conductive elements.

Figure 6A:
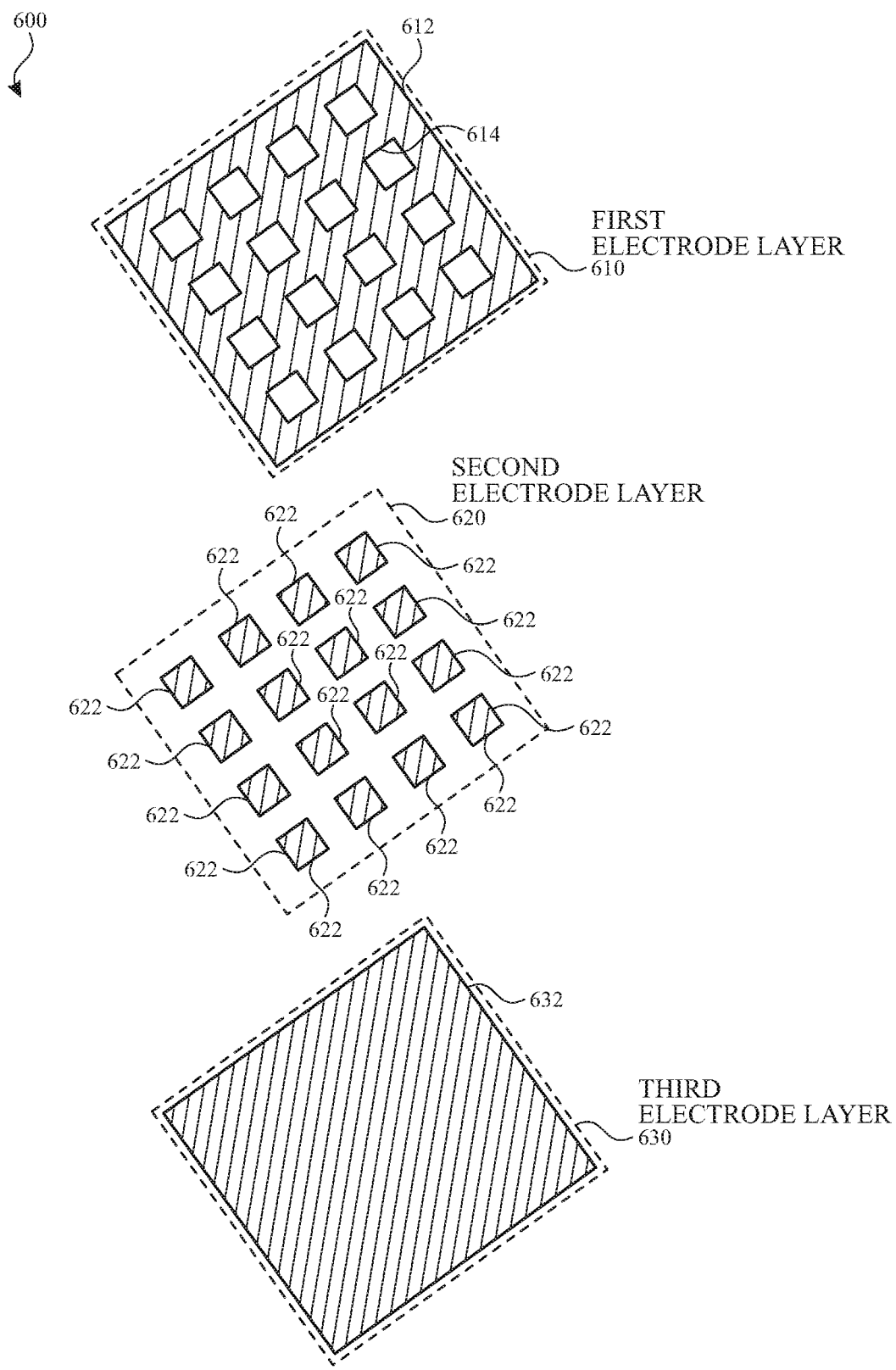
FIG. 6A illustrates top views of a plurality of electrode layers included in an exemplary touch screen according to examples of the disclosure.
Figure 6B:
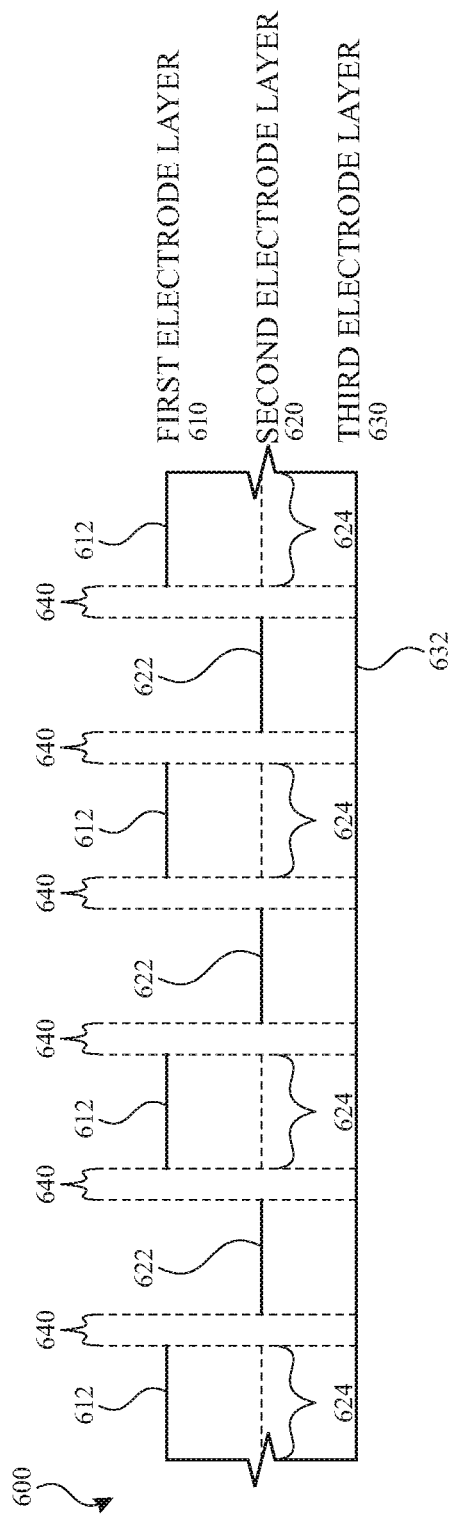
FIGS. 6B-6C illustrate cross-sectional views of a plurality of electrode layers as arranged in an exemplary touch screen according to examples of the disclosure.
Figure 6C:
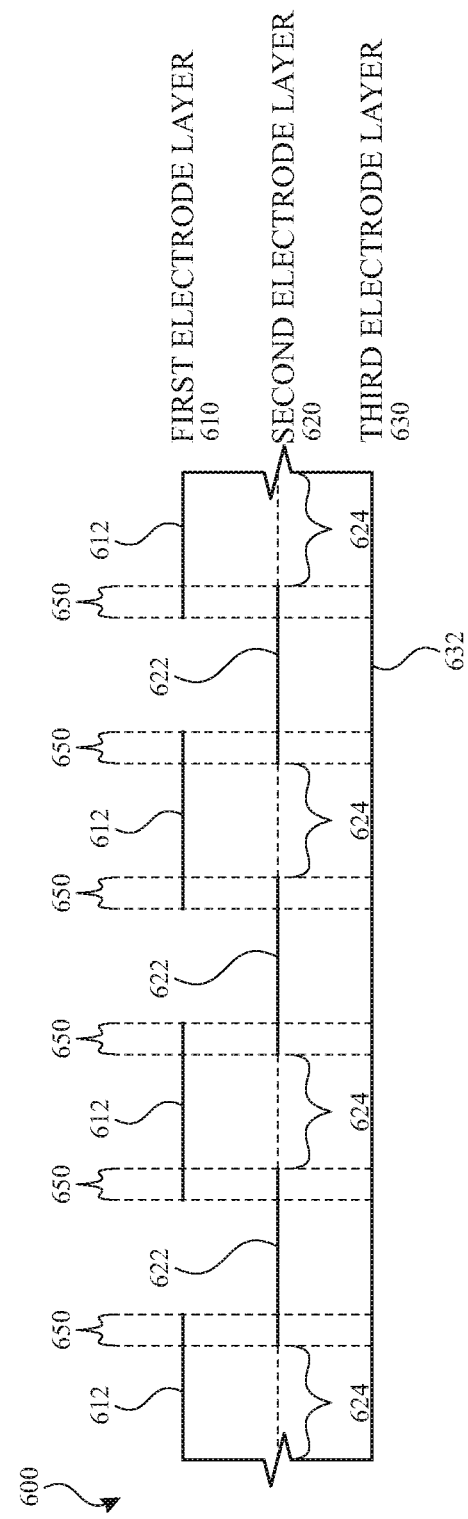

FIG. 6A illustrates top views of a plurality of electrode layers 610, 620, and 630 included in an exemplary touch screen 600 according to examples of the disclosure. In some examples, touch screen 600 can include a first electrode layer 610, a second electrode layer 620, and a third electrode layer 630. First electrode layer 610 can include a first shielding electrode 612 (e.g., top shielding electrode 530 illustrated in FIG. 5B). Second electrode layer 620 can include a plurality of touch electrodes 622 (e.g., touch electrodes 502-510 illustrated in FIGS. 5A-B) and one or more routing traces (e.g., routing traces 522-528 illustrated in FIGS. 5A-B). Third electrode layer 630 can include a second shielding electrode 632 (e.g., a bottom shielding electrode). In some examples, first electrode layer 610 can be patterned to include a plurality of openings 614 fully or partially overlap with touch electrodes 622 when the touch screen is assembled, as discussed above with reference to FIGS. 5A-5B and further with reference to FIGS. 6B-6C below. Electrode layers 610, 620, and 630 are illustrated side-by-side here merely to show exemplary patterns of each layer. In some examples, the electrode layers 610, 620, and 630 can be stacked to assemble touch screen 600.

During operation, touch electrodes 622 can produce one or more touch signals, which can be transmitted to sense circuitry by way of a plurality of routing traces, as described above with reference to FIGS. 2-4, for example. In some examples, one or more touch electrodes 622 can be electrically coupled to the first shielding electrode 612 and/or the second shielding electrode 632. The first shielding electrode 612, second shielding electrode 632, and one or more touch electrodes 622 (coupled to one or more of the shielding electrodes) can receive one or more AC or DC voltage signals, in some examples. The first shielding electrode 612 and second shielding electrode 632 can receive the same signal or different signals, for example. As described above with reference to FIGS. 5A-5B, the AC or DC voltage signals applied to first shielding electrode 612 and second shielding electrode 632 can comprise one or more signals (e.g., from voltage source 306 illustrated in FIGS. 3A-3B) applied to touch sensing circuitry (e.g., touch sensing circuitry 300 or 350 illustrated in FIGS. 3A-3B), for example. In some examples, first electrode layer 610, second electrode layer 620, and third electrode layer 630 can be electrically coupled together using a plurality of vias, as will be described below. In this manner, the first shielding electrode 612, the second shielding electrode 632, and one or more touch electrodes 622 can receive the same signal.

Although first shielding electrode 612 is illustrated as having a grid shape with a plurality of openings 614, in some examples, other shapes are possible. For example, first shielding electrode 612 can comprise a plurality of rectangular openings. Other shapes are possible. Although second electrode layer 620 is illustrated as including a plurality of touch electrodes 622 disposed in an array, in some examples, other electrode shapes are possible. For example, a plurality of row electrodes and a plurality of column electrodes on the same layer or different layers can be used. Although second shielding electrode 632 is illustrated as a continuous electrode on the third electrode layer 630, in some examples, second shielding electrode 632 can be patterned.

FIGS. 6B-6C illustrate cross-sectional views of the plurality of electrode layers 610, 620, and 630 as arranged in an exemplary touch screen 600 according to examples of the disclosure. As illustrated in FIG. 6B, in some examples, the first shielding electrode 612 and the plurality of touch electrodes 622 can be arranged in non-overlapping positions. For example, there can be non-overlapping sections 640 in the touch screen 600 where neither the first shielding electrode 612 nor the touch electrodes 622 may be located. Including non-overlapping sections 640 in touch screen 600 can reduce capacitive coupling between the first shielding electrode 612 and the touch electrodes 622, for example. As illustrated in FIG. 6C, in some examples, the first shielding electrode 612 and the plurality of touch electrodes 622 can be arranged in overlapping positions. For example, there can be overlapping sections 650 in the touch screen 600 where both the first shielding electrode 612 and the touch electrodes 622 may be located. In some examples, the overlapping section 650 can cause one or more touch electrodes 622 to capacitively couple to the first shielding electrode 612.

In some examples, first electrode layer 610, second electrode layer 620, and third electrode layer 630 can be electrically coupled by one or more vias. The one or more vias can be placed in different locations of the device. For example, some of the vias can be placed in bond pad regions, and some of the vias can be placed in an edge region of the device. Exemplary placement of the vias will now be described with reference to FIGS. 7A-7F.

Figure 7A:
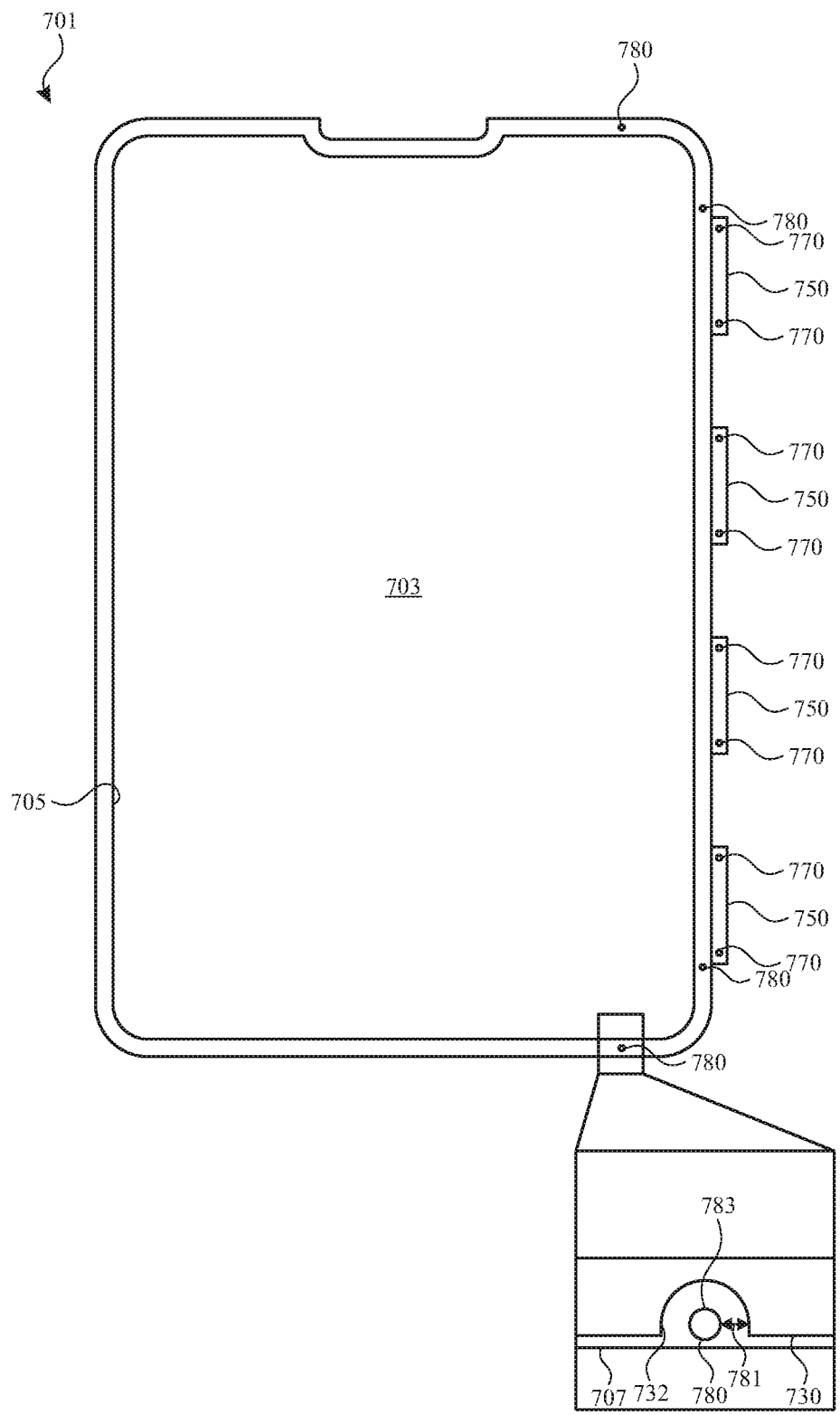
FIGS. 7A-B illustrate a top view of a portion of an exemplary electronic device including bond pad regions and vias according to examples of the disclosure.
Figure 7B:
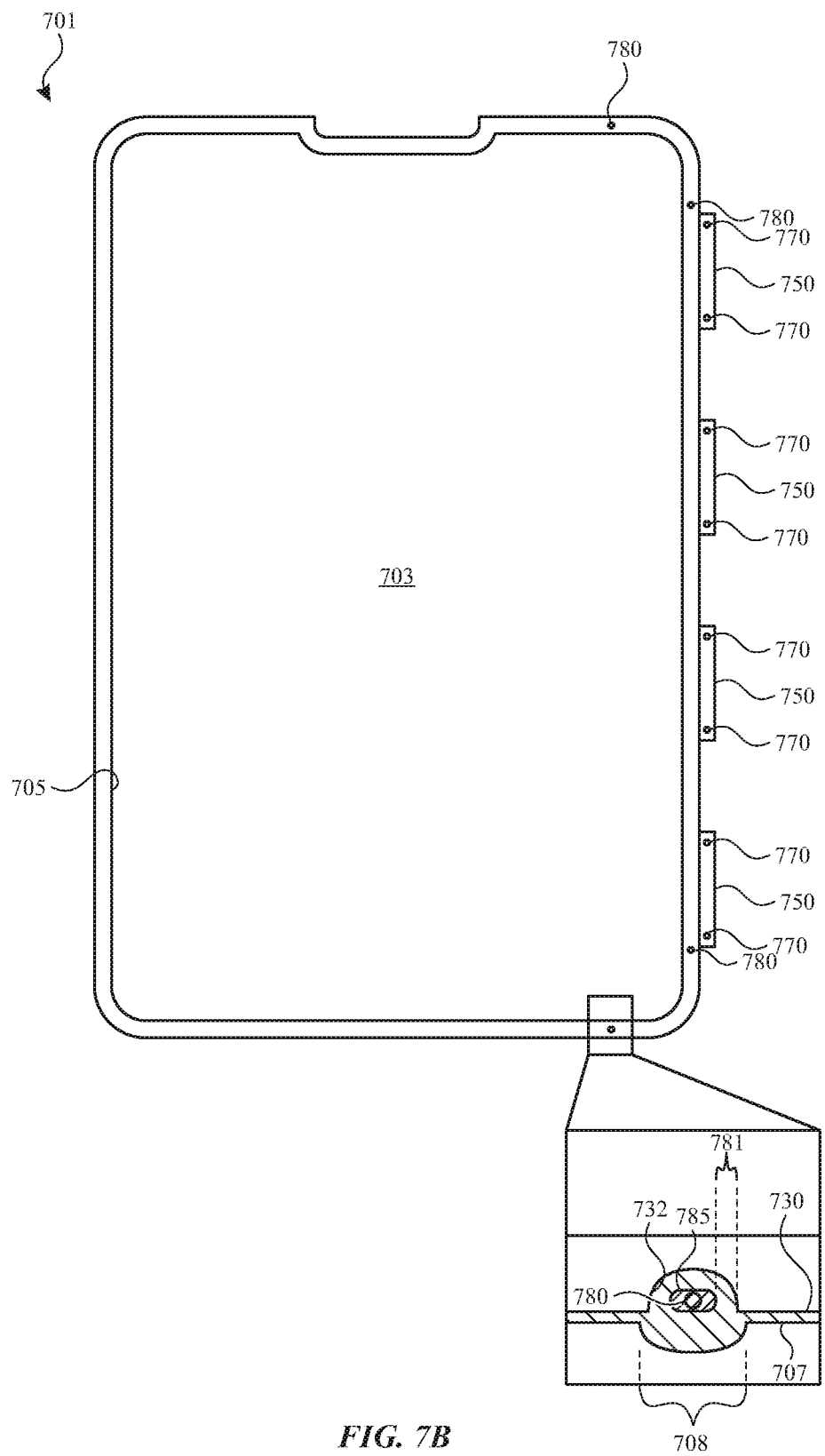

FIGS. 7A and 7B illustrate top views of an exemplary electronic device 701 including bond pad regions 750 and vias 780 and 770 according to examples of the disclosure. In some examples, electronic device 701 can further include a touch screen placed in inner region 703 similar to one or more touch screens described with reference to FIGS. 1-6. Inner region 703 can be fully or partially surrounded by an edge region 705 of the device 701, for example. Electronic device 701 can include multiple bond pad regions 750. The bond pad regions 750 can include one or more connectors (e.g., bond pads) that may electrically couple one or more routing traces (e.g., routing traces 522-528 illustrated in FIGS. 5A-5B) to off-panel circuitry (e.g., touch circuitry 300 or 350 illustrated in FIGS. 3A and 3B, respectively).

As discussed above, the device can include multiple types of vias, such as shield-sensor vias and shield-shield vias. Shield-sensor vias can electrically couple one or more shielding layers to the touch sensing layer. Shield-shield vias can electrically couple multiple shielding layers together. Shield-sensor vias can be located in regions where a two-layer structure (described below) is located. For example, the bond pad regions 750 can include a two-layer structure, and shield-sensor vias 770 can be located in the bond pad regions 750. Bond pad regions 750 can include a two-layer structure comprising two electrode layers (e.g., a top shielding layer such as first electrode layer 610 and a touch sensing layer such as second electrode layer 620, as illustrated in FIGS. 6A-C). For example, one of the electrode layers (e.g., the touch sensing layer) can include one or more connective tabs located in the bond pad region 750 where shield-sensor vias 770 can be formed.

In some examples, electronic device 701 can further include shield-shield vias 780, which can couple another pair of electrode layers (e.g., first electrode layer 610, which can be a top shielding layer, and third electrode layer 630, which can be a bottom shielding layer) of the electronic device. The shield-shield vias 780 can be placed in an edge region 705 (e.g., a border region) of the electronic device 701 with a first opaque mask 730 (illustrated in FIGS. 7C and 7D), for example. In some examples, first opaque mask 730 can include a plurality of notches 732 where the shield-shield vias 780 can be located. The shield-shield vias 780 can be located in the edge region 705 of the device while being electrically separated (e.g., maintaining a distance 781 away) from the first opaque mask 730. In this way, although first opaque mask 730 can include a conductive material, first opaque mask 730 and shield-shield vias 780 can be electrically isolated. As shown in FIGS. 7A-7B, the first electrode layer 707 can be located beneath the opaque mask 730 and can be exposed in the locations of the notches 732 in the opaque mask. In some embodiments, an insulating material is located between the first opaque mask 730 and the first electrode layer 707 to electrically isolate the first opaque mask 730 and the first electrode layer 707. Placing shield-shield vias 780 in notches 732 of first opaque mask 730 can conserve space in the bond pad regions 750, for example. Additionally or alternatively, placing shield-shield vias 780 in first opaque mask 730 can allow the electronic device 701 to be configured with smaller bond pad regions 750. The top view illustrated in FIGS. 7A-7B includes the first electrode layer 707, for example. It is understood that the third electrode layer overlaps with the first electrode layer 707 at locations of the vias 780 so that the vias 780 may provide an electrical connection between the first and third electrode layers.

Vias 780 can include endcaps 783 or 785, for example. In some examples, as shown in FIG. 7A, vias 780 can include circular endcaps 783. Circular endcaps 783 can have a diameter that is substantially the same across all directions across the top of endcaps 783. As shown in FIG. 7B, in some examples, vias 780 can have oval endcaps 785 with an extended structure in one dimension. Also shown in FIG. 7B, in some examples, the first electrode layer 707 can include tabs 708 that extend in an outward direction from vias 780. The tabs 708 are extended portions of the first electrode layer 707 that extend from the rest of the edge of the first electrode layer 707. It should be understood that, although not shown in FIG. 7B, the third electrode layer can also include tabs that overlap the tabs 708 of the first electrode layer 707. Other shapes and boundaries for the first electrode layer 707 and the third electrode layer that allow the first and third electrode layers to be connected by vias 780 are possible. Including one or more of oval endcaps 785 and electrode layer tabs 708 can, in some examples, increase the contact area of vias 780, thereby lowering contact resistance and improving electrical characteristics. In some examples, discussed below with reference to FIGS. 7C-7F, one or more routing traces 720 can be modified to maintain electrical isolation from vias 780.

Figure 7C:
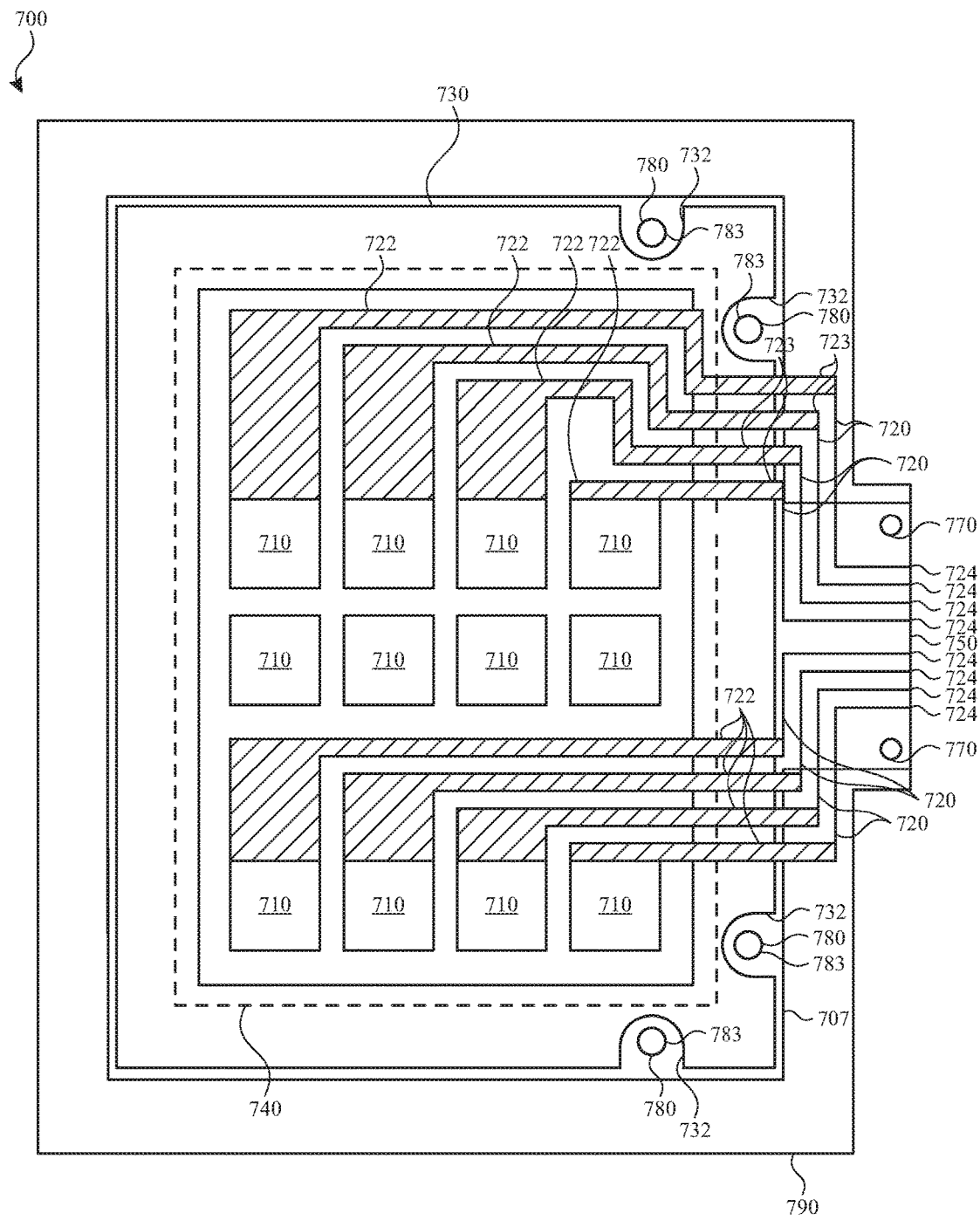
FIGS. 7C-7F illustrate top views of exemplary touch screens including routing traces having diverted portions according to examples of the disclosure.
Figure 7D:
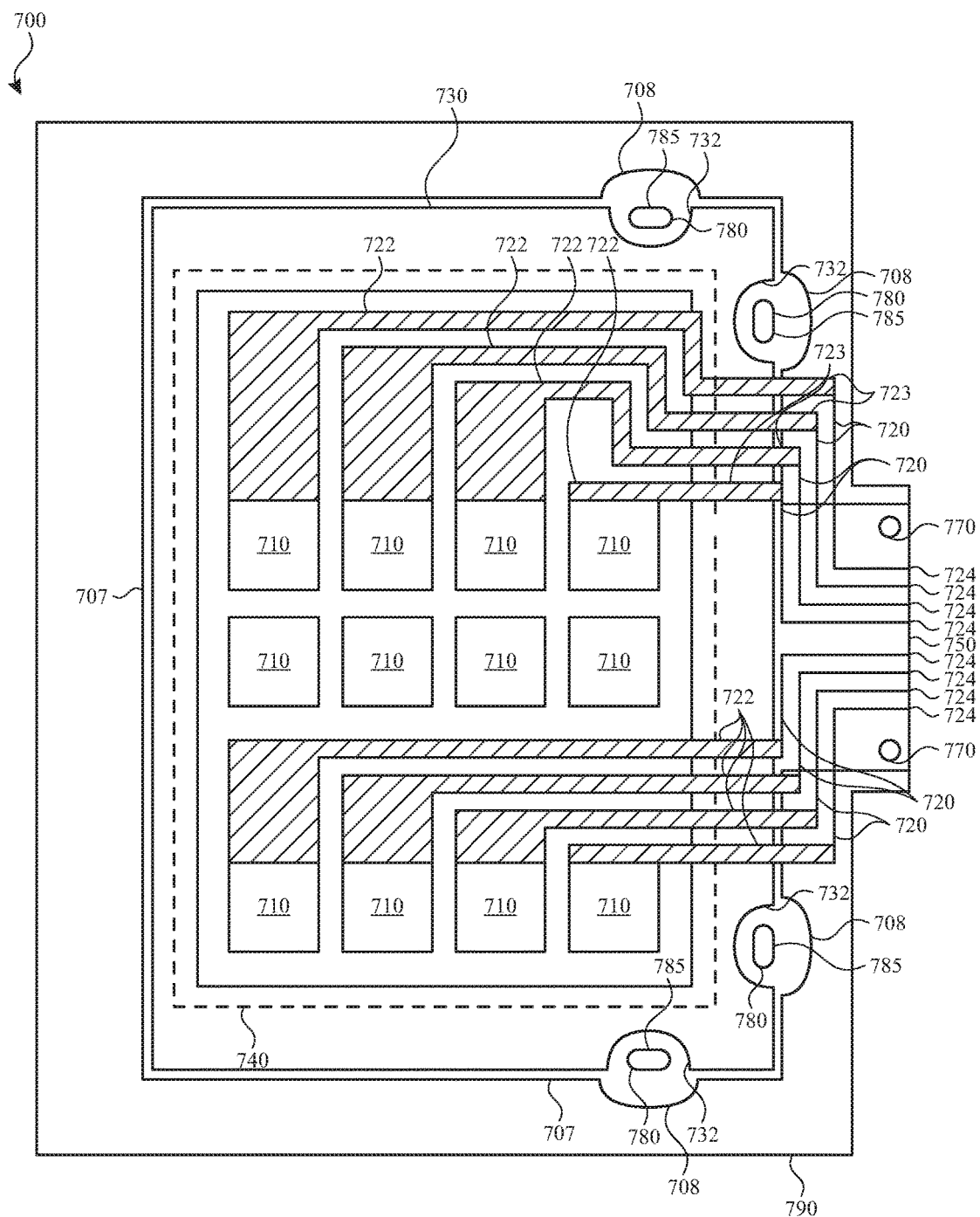

FIGS. 7C and 7D illustrate top views of exemplary touch screen 700 including routing traces 720 having diverted portions 723 attached to first sections 722 of the routing traces according to examples of the disclosure. In some examples, touch screen 700 can include a supporting substrate 790, plurality of touch electrodes 710 included in the second electrode layer, routing traces 720 included in the second electrode layer, shield-sensor vias 770 that couple the second electrode layer to one of the first electrode layer and the third electrode layer, shield-shield vias 780 that couple the first electrode layer 707 to the third electrode layer, first opaque mask 730 located on top of the first electrode layer, and second opaque mask 740 located on top of the first opaque mask. Although the first electrode layer 707 is illustrated in FIGS. 7C and 7D for ease of illustration, it should be understood that, in some examples, the first electrode layer 707 includes patterning, such as the patterning described above with reference to FIG. 6A.

As shown in FIG. 7C, in some examples vias 780 can include circular endcaps 783. As shown in FIG. 7D, in some examples vias 780 can include oval endcaps 783 and the first electrode layer 707 can include tabs 708 at locations corresponding to notches 732 of the first opaque black mask 730. It is understood that although the third electrode layer is not illustrated in FIG. 7D, the third electrode layer can also include tabs at the locations of the tabs 708 of the first electrode layer 707.

Routing traces 720 can be coupled to pixelated touch electrodes 710 to form connections in the bond pad region 750 to touch circuitry (e.g., touch circuitry 300 or 350) or other circuitry. Routing traces 720 can include first conductive segments 722 and second conductive segments 724. In some examples, first conductive segments 722 can include a transparent conductive material such as ITO, AZO, indium-doped cadmium-oxide, barium stannite or another transparent conductive material. Second conductive segments 724 can include a metallic conductive material such as copper, gold, or another opaque conductive material. In some examples, second conductive segments 724 can include a transparent conductive material that is the same as or different from a material included in first conductive segments 722. In some examples, first conductive segments 722 can have a lower electrical conductivity than second conductive segments 724.

Some of the routing traces 720 can include diverted portions 723. As illustrated in FIGS. 7C and 7D, the one or more diverted portions 723 can be coupled between the first conductive segments 722 and the second conductive segments 724 of routing traces 720, for example. In some examples, diverted portions 723 can include a same material included in first conductive segments 722. In some examples, the diverted portions 723 of the routing traces can be placed and shaped to avoid the shield-shield vias 780. If, for example, rather than including the diverted portions 723 illustrated in FIGS. 7C-7D, the first conductive segments 722 of the routing traces 720 extended to the locations of the second conductive segments 724 of the routing traces, the routing traces 722 could overlap the shield-shield vias 780. Because the routing traces 720 are located on the second electrode layer which is between the first electrode layer 707 and the third electrode layer, overlapping the routing traces with the shield-shield vias 780 could cause the routing traces to be coupled to the first electrode layer 707 and the second electrode layer. Thus, the diverted portions 723 of the routing traces 720 can be included to allow the routing traces to avoid the shield-shield vias 780.

Figure 7E:
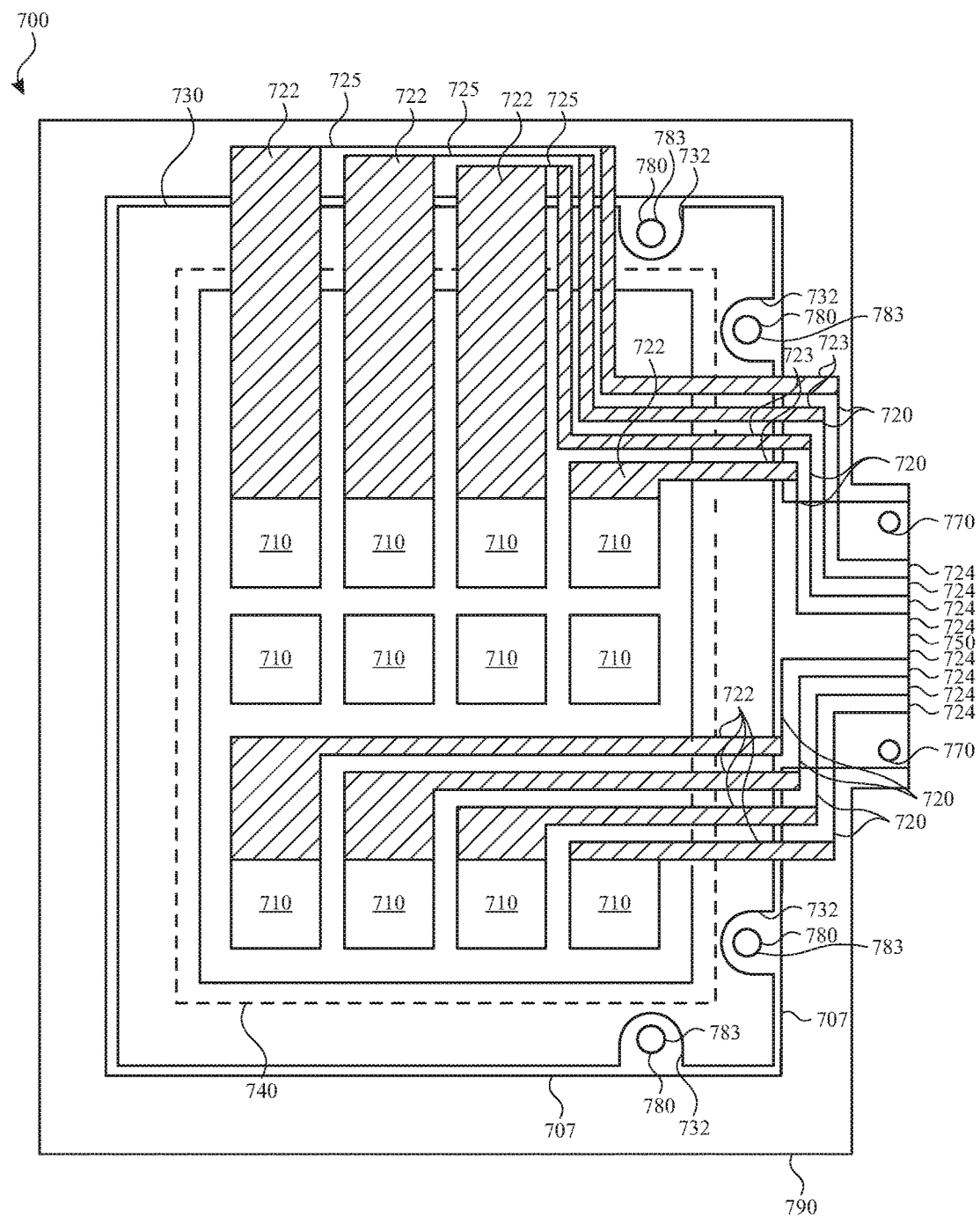
Figure 7F:
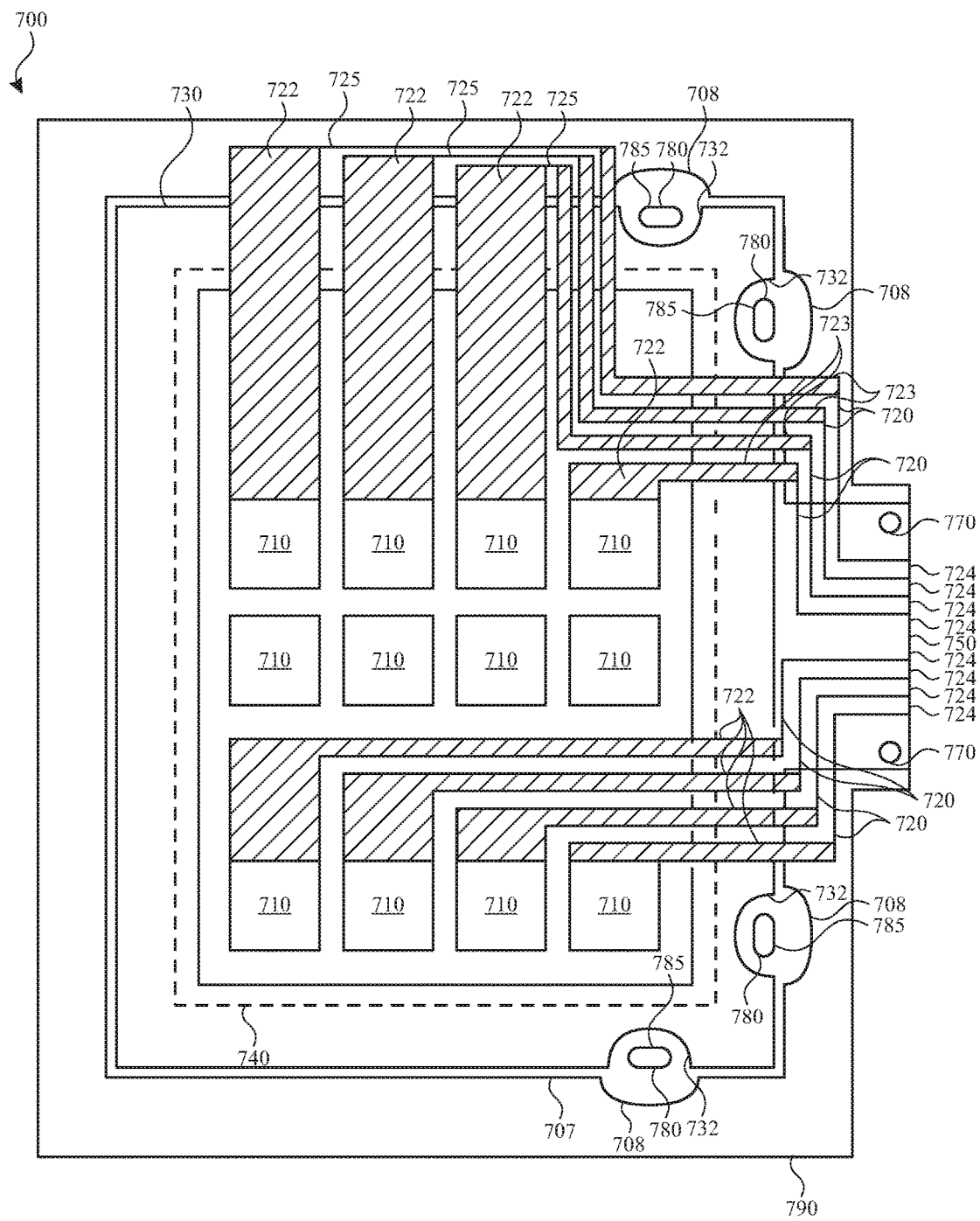

FIGS. 7E and 7F illustrate top views of exemplary touch screen 700 including a plurality of routing traces 720 having diverted portions 723 attached to third sections 725 of the routing traces according to examples of the disclosure. Although the first electrode layer 707 is illustrated in FIGS.

7E and 7F for ease of illustration, it should be understood that, in some examples, the first electrode layer 707 includes patterning, such as the patterning described above with reference to FIG. 6A.

In some examples, the third sections 725 of the routing traces 720 can include the same material (e.g., an opaque conductive material such as copper or gold or a transparent conductive material such as ITO, AZO, indium-doped cadmium-oxide, or barium stannite) as included in the second sections 724 of the routing traces. Some of the routing traces 720 can include diverted portions 723, as will be described below. In some examples, the first conductive segments 722 and diverted portions 723 of the routing traces 720 can have a lower electrical conductivity than the second conductive segments 724 and the third conductive segments 725. As illustrated in FIGS. 7E and 7F, in some examples, one or more routing traces 720 including diverted portions 723 can further include third conductive segments 725 between first conductive segments 722 and the diverted portions 723. The diverted portions 723 can connect the third conductive segments 725 to the second conductive segments 724, for example. In some examples, the third conductive segments 725 can include the same material included in second conductive segments 724. Further, in some examples, the diverted portions 723 can include the same material included in first conductive segments 722. As described above with reference to FIGS. 7C and 7D, the diverted portions 723 of the routing traces 720 allow the routing traces to avoid overlapping and, thus, making electrical contact with, the shield-shield vias 780.

The touch screen 700 can include an inner region (e.g., active area and/or display area) including the touch electrodes 710 and the first conductive portions 722 of the routing traces 720. In some examples, the inner region can further include display pixels for displaying an image on touch screen 700. The first conductive portions 722 of the routing traces 720 can be transparent to reduce visual artifacts on a display included in the inner region of the touch screen 700, for example. In some examples, the outer region (e.g., edge region) that includes the first opaque mask 730, the second opaque mask 740, shield-sensor vias 770, and shield-shield vias 780 can fully or partially be located around (e.g., surround) the inner region. Thus, the touch screen 700 can include an inner region that includes touch electrodes 710 and display pixels and an outer region that is not part of the display and is covered by one or more opaque masks.

As shown in FIG. 7E, in some examples vias 780 can include circular endcaps 783. As shown in FIG. 7F, in some examples vias 780 can include oval endcaps 783 and the first electrode layer 707 can include tabs 708 at locations corresponding to notches 732 of the first opaque black mask 730. Although not shown in FIG. 7F, in some embodiments the third electrode layer includes tabs at the locations of the tabs 708 of the first electrode layer 707. Touch screen 700 can further include a bond pad region 750 where a plurality of routing traces 720 can be located to form connections to touch circuitry (e.g., touch circuitry 300 or 350) or to other circuitry. Additionally, in some examples, the shield-sensor vias 770 can be located in the bond pad region 750.

Although not illustrated in the figures, examples of the disclosure can include the routing traces having a first material in the inner region and a second material in the outer region. For example, the routing traces can include a transparent conductive material in the inner region and a metallic conductive material in the outer region. The different materials can connect at the location of the touch sensing layer where the first opaque mask 730 or the second opaque mask 740 overlaps.

In some examples, the shield-sensor vias 770 can couple the first electrode layer 707 (e.g., first electrode layer 610, which can be a top shielding layer) including a first shielding electrode (e.g., top shielding electrode 612, which can be a patterned shielding electrode) to a second electrode layer (e.g., second electrode layer 620, which can be a touch sensing layer) including the touch electrodes 710 (e.g., touch electrodes 408, 502-510, or 622) and routing traces 720. Shield-sensor vias 770 can be placed in the bond pad region 750 proximate to, but not overlapping, routing traces 720, for example. In some examples, the second electrode layer can include one or more tabs placed in the bond pad region 750 through which vias 770 can be formed.

In some examples, the shield-shield vias 780 can couple the first electrode layer (e.g., first electrode layer 610 illustrated in FIGS. 6A-C) including a first shielding electrode (e.g., first shielding electrode 612, which can be a top shielding electrode) to a third electrode layer (e.g., third electrode layer 630, which can be a bottom shielding layer) including a second shielding electrode (e.g., second shielding electrode 630, which can be a bottom shielding electrode). The shield-shield vias 780 can be located in the edge region of the touch screen away from bond pad region 750. In some examples, the first opaque mask 730 can include a non-metallic conductive material and can include a plurality of notches 732 to accommodate the shield-shield vias 780 so that the shield-shield vias 780 do not contact the first opaque mask.

By coupling the first and second electrode layers using the shield-sensor vias 770 and coupling the first and third electrode layer using the shield-shield vias 780, the first, second, and third electrode layers can all be coupled together. In some examples, spacing between the shield-sensor vias 770 and the shield-shield vias 780 can be based on a targeted electrical performance of the touch screen 700. For example, the shield-sensor vias 770 and the shield-shield vias 780 can be placed close to each other on the touch screen 700 to reduce the electrical resistance of the conductive pathway between the vias. In some examples, the shield-shield vias 780 can also be placed such that they are away from the bond pad region 750 to conserve space within the bond pad region 750. Further, shield-shield vias 780 can be placed at least a threshold distance away from the routing traces 720 to reduce or eliminate capacitive coupling between the shield-shield vias and the routing traces, for example. In some examples, the shield-shield vias 780 can be placed in parts of the outer region with as few routing traces 720 as possible. That is, certain regions of the outer region may have different densities of routing traces 720. In some examples, shield-shield vias 780 can be placed in a part of the outer region having a lower density of routing traces (e.g., further from the bond pad region 750) than another part of the outer region (e.g., closer the bond pad region 750). Although FIGS. 7A-C illustrate shield-shield vias 780 as being located near corners on a bond pad side 750 of the touch screen 700, in some examples, shield-shield vias 780 can be located along an edge of the device. For example, shield-shield vias 780 can be placed along the side opposite the bond pads 750 to avoid routing traces 720 or along the bond pad side to be closer to shield-sensor vias 770 to reduce electrical resistance between the types of vias. Other locations for shield-shield vias 780 can be selected based on electrical resistance between the types of vias and/or the density of the routing traces 720 at various locations on the touch screen 700.

One or more routing traces can comprise one or more diverted portions 723. In some examples, the diverted portions 723 can include a transparent conductive material (e.g., ITO, AZO, indium-doped cadmium-oxide, or barium stannite). Adding the diverted portions 723 can make the routing traces 720 longer than a distance between the respective touch electrode 710 and the shield-shield vias 780, but can ensure that each routing trace maintains the threshold distance away from the shield-shield vias.

Although a number of touch electrodes 710 illustrated in FIGS. 7B-7C are shown without being coupled to routing traces, it should be understood that, in some examples, they may well be. Further, although routing traces 720 are illustrated as being connected to touch electrodes 710 by portions having substantially the same width as the touch electrodes, in some examples, the routing traces can have a narrower width where connected with the touch electrodes. For example, the first sections 722 of the routing traces 720 can have a width that is narrower than the touch electrodes 710. In some examples, touch screen 700 can include touch electrodes having a different pattern than illustrated in FIGS. 7B-7C, such as touch electrodes arranged in rows and columns (e.g., row and column touch electrodes as illustrated in FIG. 4A).

As discussed above, in some examples, the shield-shield vias 780 and metal portions 724 of the routing traces 720 can be concealed by a second opaque mask 740. The second opaque mask 740 can be positioned such that it overlaps at least a portion of first opaque mask 730. In some examples, the second opaque mask 740 can surround the outer edge of the first opaque mask 730. The first opaque mask 730 can extend inward from the inner edge of second opaque mask 740. The alignment of first opaque mask 730 and second opaque mask 740 will be described in further detail with reference to FIG. 8.

Figure 8:
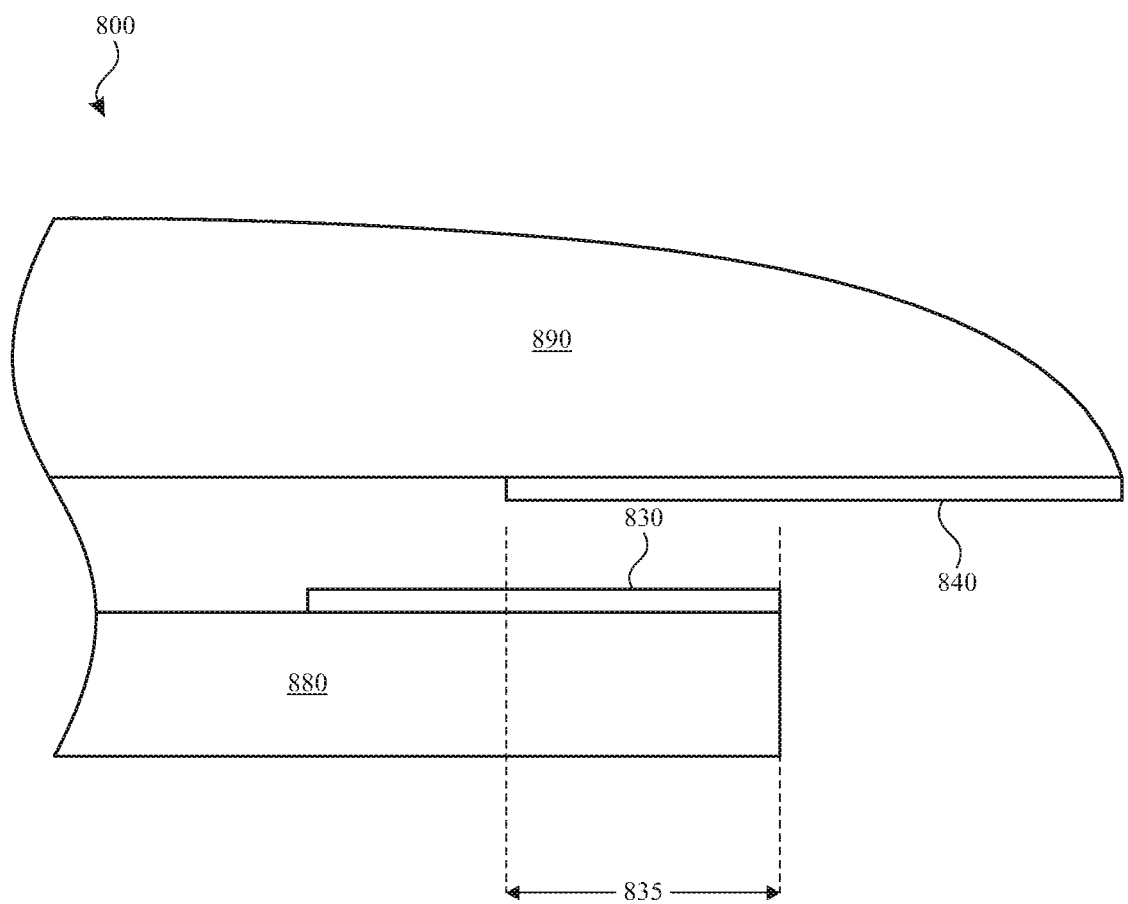
FIG. 8 illustrates a cross-sectional view of a portion of an exemplary touch screen including a cover material, a first opaque mask, and a second opaque mask according to examples of the disclosure.

FIG. 8 illustrates a cross-sectional view of exemplary touch screen 800 including a cover material 890, a first opaque mask 830, and a second opaque mask 840 according to examples of the disclosure. In some examples, touch screen 800 can include one or more components of touch screen 600 or 700. Touch screen 800 can further include first opaque mask 830, second opaque mask 840, substrate 880, and cover material 890. In some examples, first opaque mask 830 can be formed on substrate 880, and second opaque mask 840 can be formed on an underside (e.g., a side internal to the electronic device) of cover material 890. In some examples, first opaque mask 830 can be located closer to the touch sensing layer than the second opaque mask 840. As described above with reference to FIGS. 7A-7F, first opaque mask 830 and second opaque mask 840 can both be located (i.e., overlap) in overlapping section 835. In some examples, one or more vias (e.g., shield-shield vias 780) can be placed within overlapping section 835. In this way, notches (e.g., notches 732) can be formed in first opaque mask 830 to accommodate the vias, and the vias can still be concealed by second opaque mask 840. In some examples, substrate 880 can be a transparent insulating material layer that provides structural support to one or more material layers placed on the substrate (e.g., one or more electrode layers or other components). In some examples, such as in examples where the first opaque mask 830 includes an insulating material, one or more of the electrode layers can be located between the opaque mask and substrate 880. Further, in some examples, substrate 880 can include one or more substrates joined together by one or more adhesives (not shown).

In some examples, touch screen 800 can include one or more electrode layers electrically coupled by one or more vias. The structure of the vias will now be described with reference to FIGS. 9A-9D.

FIGS. 9A-9D illustrate cross-sectional views of exemplary touch screen 900 according to example of the disclosure. In some examples, touch screen 900 can include first electrode layer 910, second electrode layer 920, and third electrode layer 930. First electrode layer 910 can include a first shielding electrode (e.g., top shielding electrode 612), second electrode layer 920 can include a plurality of touch electrodes (e.g., touch electrodes 510, 622, or 710), and third electrode layer 930 can include a second shielding electrode (e.g., bottom shielding electrode 632). In some examples, shield-shield via 980 can optionally include a conductive portion 925 that contacts the second electrode layer 920. Touch screen 900 can further include a first substrate 950, second substrate 960, shield-sensor via 970, and shield-shield via 980. Shield-sensor via 970 can include endcaps 972 or 994 and middle section 974. Shield-shield via 980 can include endcaps 982 or 992 and middle section 984.

Figure 9A:
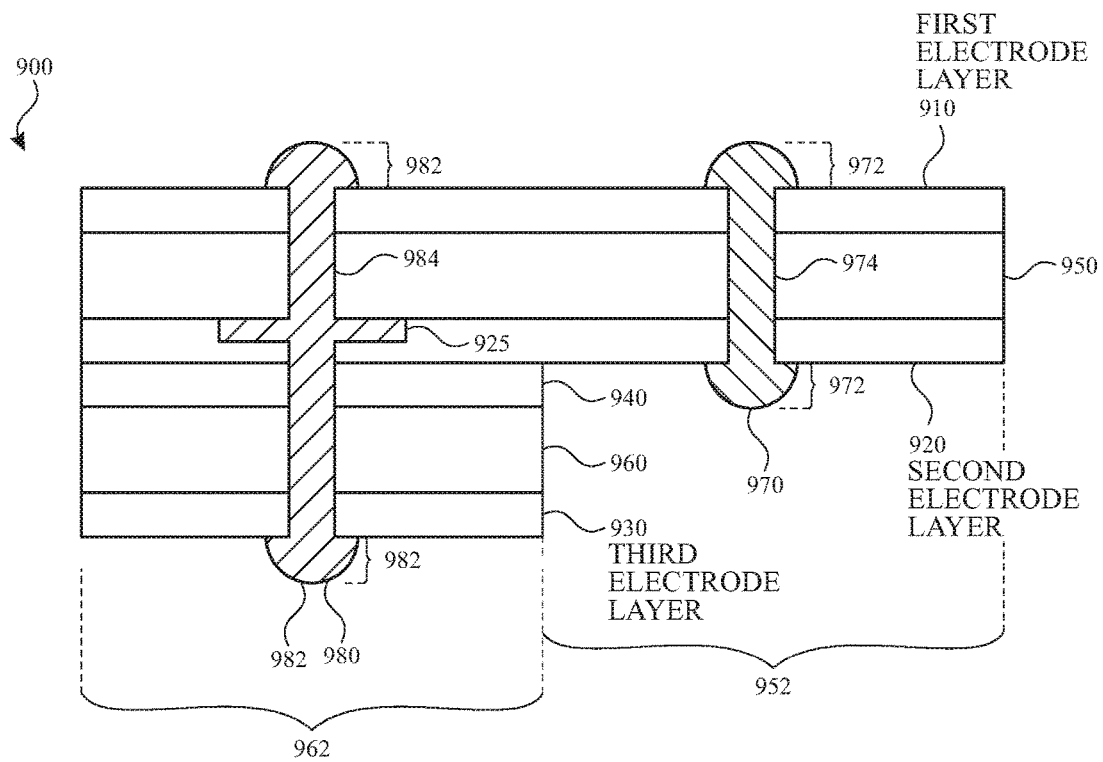
FIGS. 9A-9D illustrate cross-sectional views of an exemplary touch screen including vias coupling a plurality of electrode layers according to examples of the disclosure.
Figure 9B:
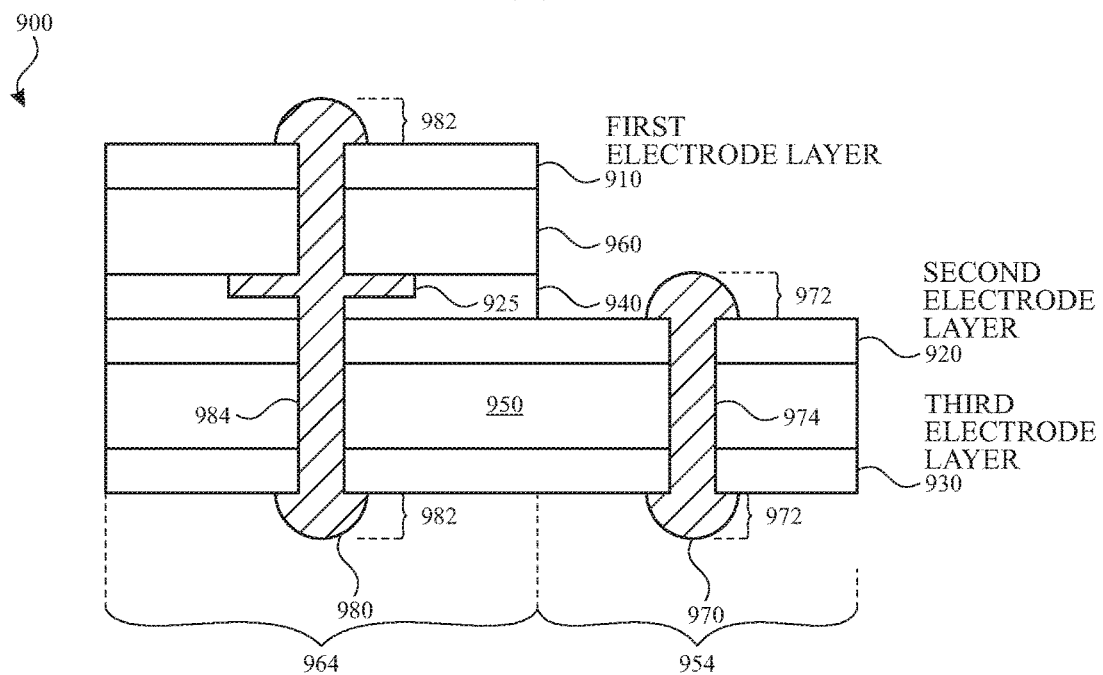
Figure 9C:
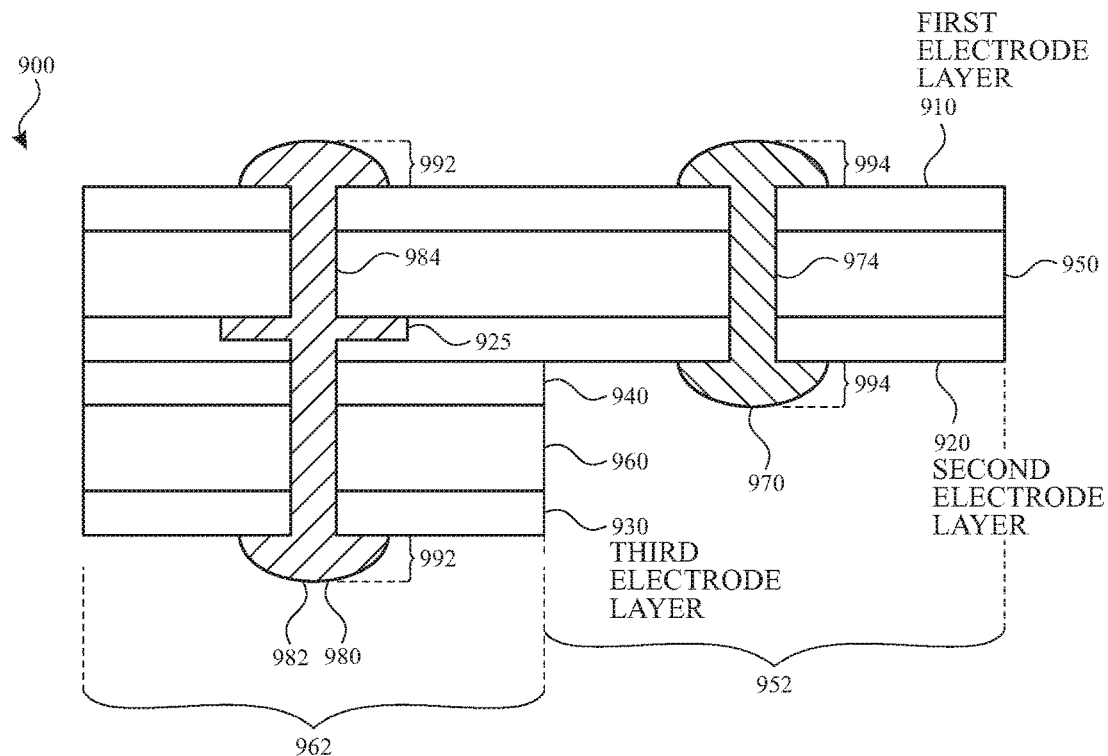
Figure 9D:
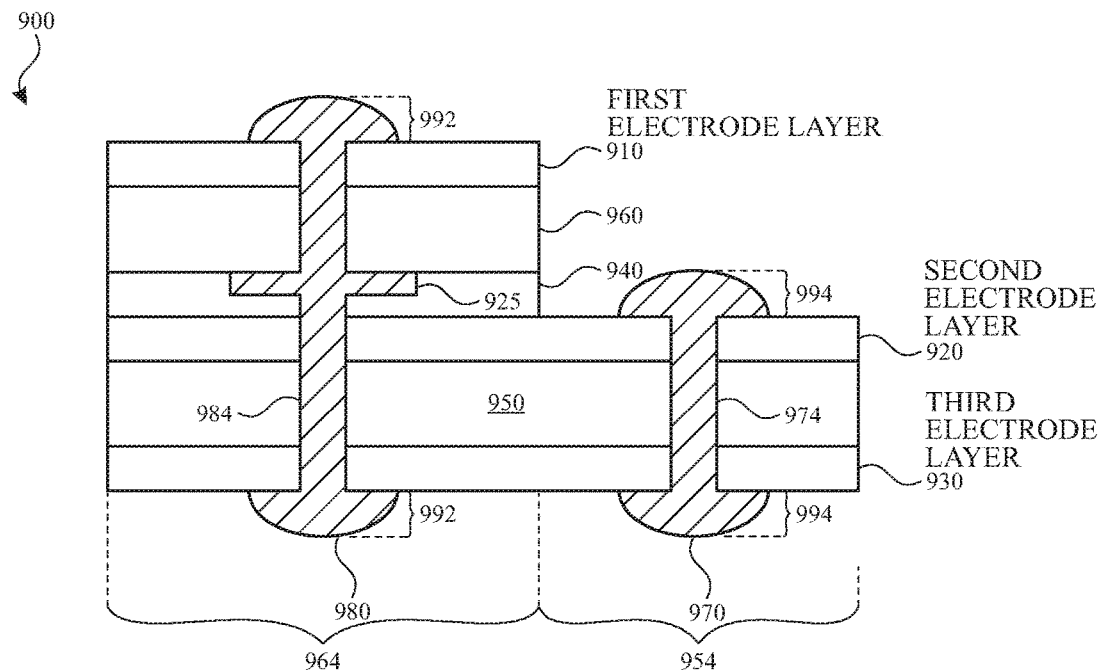

Although FIGS. 9A-9D illustrate cross-sectional views of touch screen 900, it should be noted that the top view structure of via endcaps 972, 982, 992, and 994 can vary. For example, endcaps 972 and 982 can be circular endcaps (e.g., as illustrated in FIGS. 7A, 7C, and 7E above) and endcaps 992 and 994 can be oval endcaps with extended structure in one dimension (e.g., as illustrated in FIGS. 7B, 7D, and 7F above). FIGS. 7B, 7D, and 7F illustrate a cross-section of touch screen 900 across the dimension in which oval endcaps 992 and 994 are extended, for example. Although FIGS. 7B, 7D, and 7F illustrate endcaps 992 and 994 as being extended in the same dimension, in some examples, one or more endcaps 992 and/or 994 can be extended in different dimensions. In some examples, vias 970 and 980 can include oval endcaps 992 and 994 on both sides, as illustrated in FIGS. 9C and 9D. In some examples, vias 970 and 980 can include oval endcaps 992 and 994 on one side and circular endcaps 972 and 982 on another side.

In some examples, shield-sensor via 970 can be placed in an overhanging portion 952 of the touch screen 900, where part of first electrode layer 910 and second electrode layer 920 can extend past the third electrode layer 930. For example, overhanging portion 952 can be placed in a bond pad region (e.g., bond pad region 750) of the electronic device. In some examples, shield-sensor via 970 can include a conductive paste and can thereby form an electrical connection between first electrode layer 910 and second electrode layer 920. In some examples, endcaps 972 or 994 can form connections to the first electrode layer 910 and the second electrode layer 920. The endcaps 972 or 994 can be electrically coupled to each other by way of middle portion 974, which can be placed within a hole drilled through first electrode layer 910, second electrode layer 920, and first substrate 950 after the touch screen 900 is assembled, for example. In this way, the first electrode layer 910 and the second electrode layer 920 can be electrically coupled, for example.

In some examples, the first electrode layer 910, second electrode layer 920, and first substrate 950 can include holes before the touch screen 900 is assembled. The holes can be aligned and filled with the conductive material to form via 970. In some examples, the endcaps 972 or 994 of shield-sensor via 970 can include any conductive structure that creates an electrical pathway between the respective first electrode layer 910 or second electrode layer 920 and the middle portion 974 of the shield-sensor via 970. Examples of the disclosure can include endcaps 972 or 994 having a different shape (e.g., different than cap-shaped) than illustrated in the figures.

Shield-shield via 980 can be placed in an overlapping portion 962 of the touch screen 900 where parts of the first electrode layer 910, the second electrode layer 920, and the third electrode layer 930, may be located (e.g., overlap) for example. In some examples, the overlapping portion 964 of touch screen 900 can be placed in an edge region of an electronic device (e.g., as illustrated in FIGS. 7A-7F). Shield-shield via 980 can include a conductive paste and can thereby form an electrical connection between first electrode layer 910 and third electrode layer 930, for example. In some examples, endcaps 982 or 992 can form connections to the first electrode layer 910 and the third electrode layer 930. The endcaps 982 or 992 can be electrically coupled by way of middle portion 984, which can be placed within a hole drilled through first electrode layer 910, second electrode layer 920, third electrode layer 930, substrate 960, adhesive 940, and first substrate 950 after touch screen 900 is assembled, for example. In this way, first electrode layer 910 and third electrode layer 930 can be electrically coupled. In some examples, the first electrode layer 910, second electrode layer 920, third electrode layer 930, second substrate 960, adhesive 940, and first substrate 950 can be include holes before the touch screen 900 is assembled. The holes can be aligned and filled with the conductive material to form via 980. In some examples, the endcaps 982 or 992 of shield-shield via 980 can include any conductive structure that creates an electrical pathway between the respective first electrode layer 910 or third electrode layer 930 and the middle portion 984 of the shield-shield via. That is to say, the endcaps 982 or 992 need not be cap-shaped, although in some examples they may be.

In some examples, the shield-shield via can optionally include a conductive portion 925 that electrically contacts the second electrode layer 920, thereby coupling the first electrode layer 910, the second electrode layer 920, and the third electrode layer 930 together. In some examples, conductive portion 925 can be omitted. Although conductive portion 925 is illustrated as being on a top side of the second electrode layer 920, in some examples, the conductive portion can have a different location (e.g., on a bottom side of or embedded in the second electrode layer).

As illustrated in FIGS. 9B and 9D, in some examples, the first substrate 960 and the second electrode layer 920 can be joined by adhesive 940. Overhanging portion 954 can include part of the second electrode layer 920 and part of the third electrode layer 930, for example. The overhanging portion 954 can be placed in a bond pad region (e.g., bond pad region 950) of the device including touch screen 900. Shield-sensor via 970 can include a conductive paste and can thereby form an electrical connection between third electrode layer 930 and second electrode layer 920, for example. In some examples, endcaps 972 or 994 can form connections to the third electrode layer 930 and the second electrode layer 920. The endcaps 972 or 994 can be electrically coupled by way of middle portion 974, which can be placed within a hole drilled (e.g., using laser ablation) through third electrode layer 930, second electrode layer 920, and substrate 950 after touch screen 900 is assembled, for example. In this way, second electrode layer 920 and third electrode layer 930 can be electrically coupled. In some examples, the third electrode layer 930, second electrode layer 920, and substrate 950 can include holes before touch screen 900 is assembled. The holes can be aligned and filled with the conductive material to form shield-sensor via 970. In some examples, the endcaps 972 or 994 of shield-sensor via 970 can include any conductive structure that creates an electrical pathway between the second electrode layer 920 or third electrode layer 930 and the middle portion 974. Examples of the disclosure can include the endcaps 972 or 994 as having shapes different (e.g., different than cap-shaped) than illustrated in the figures.

Shield-shield via 980 can be placed in an overlapping portion 964 of touch screen 900 where the first electrode layer 910, the second electrode layer 920, and the third electrode layer 930 can be located (e.g., overlap). In some examples, overhanging portion 964 can be placed in an edge region of an electronic device including touch screen 900, as illustrated above in FIGS. 7A-7F. Shield-shield via 980 can include a conductive paste and can thereby form an electrical connection between first electrode layer 910 and third electrode layer 930, for example. In some examples, endcaps 982 or 992 can form connections to the first electrode layer 910 and the third electrode layer 930. The endcaps 982 or 992 can be electrically coupled to each other by way of middle portion 984, which can be placed within a hole drilled through first electrode layer 910, second electrode layer 920, third electrode layer 930, substrate 960, adhesive 940, and substrate 950 after touch screen 900 is assembled, for example. In this way, the first electrode layer 910 and the third electrode layer 930 can be electrically coupled. In some examples, the first electrode layer 910, second electrode layer 920, third electrode layer 930, substrate 960, adhesive 940, and substrate 950 can include holes before touch screen 900 is assembled. The holes can be aligned and filled with the conductive material to form via 980. In some examples, the endcaps 982 or 992 of shield-shield via 980 can include any conductive structure that creates an electrical pathway between the respective first electrode layer 910 or third electrode layer 930 and the middle portion 984 of the shield-shield via. That is to say, the endcaps 982 or 992 need not be cap-shaped, although in some examples they may be. In some examples, shield-shield via 980 can include a conductive portion 925 that electrically contacts second electrode layer 920, thereby coupling the first electrode layer 910, the second electrode layer 920, and the third electrode layer 930. In some examples, conductive portion 925 can be omitted. Although conductive portion 925 is illustrated as being on a top side of the second electrode layer 920, in some examples, conductive portion can have a different location (e.g., on a bottom side of or embedded in the second electrode layer 920).

Although touch screen 900 is illustrated as including first electrode layer 910, second electrode layer 920, third electrode layer 930, first substrate 950, second substrate 960, shield-sensor via 970, and shield-shield via 980, in some examples, additional or alternative components are possible. For example, touch screen 900 can include additional adhesives, substrates, passivation layers, and/or conformal layers not shown here. In some examples, substrates 950 and 960 (and any additional substrates not shown here) can include materials (e.g., insulating and/or transparent materials) that provide structural support to one or more additional materials placed on the substrate (e.g., one or more electrode layers or other components). For example, although FIGS. 9A and 9C illustrate the second electrode layer 920 and the second substrate 960 as being joined by an adhesive 940, in some examples, additional or alternative adhesive layers can be used. Likewise, although FIGS. 9B and 9D illustrates the second substrate 960 as being joined to the second electrode layer 920 by adhesive 940, in some example, alternative arrangements are possible. For example, one or more of the first substrate 950 and the second substrate 960 can include multiple substrates (e.g., supportive, transparent, and/or insulating layers) joined by one or more adhesives. In some examples, touch screen 900 may not include an adhesive 940 between the second electrode layer 920 and the second substrate 960. Further, in some examples, touch screen 900 can include additional electrode layers (e.g., to accommodate row and column touch electrodes as illustrated in FIG. 4A). In some examples, one or more components of touch screen 900 may be eliminated or replaced.

FIGS. 10A-10F illustrate cross-sectional views of an exemplary touch screen 1000 during a manufacturing process according to examples of the disclosure. In some examples, touch screen 1000 can include some or all of the same components included in touch screen 900 as illustrated in FIGS. 9A and 9C. It should be understood that the touch screen 900 illustrated in FIGS. 9B and 9D can be manufactured in a similar manner to touch screen 1000, although the arrangement of some components may differ, resulting in some deviations in manufacturing.

Figure 10A:
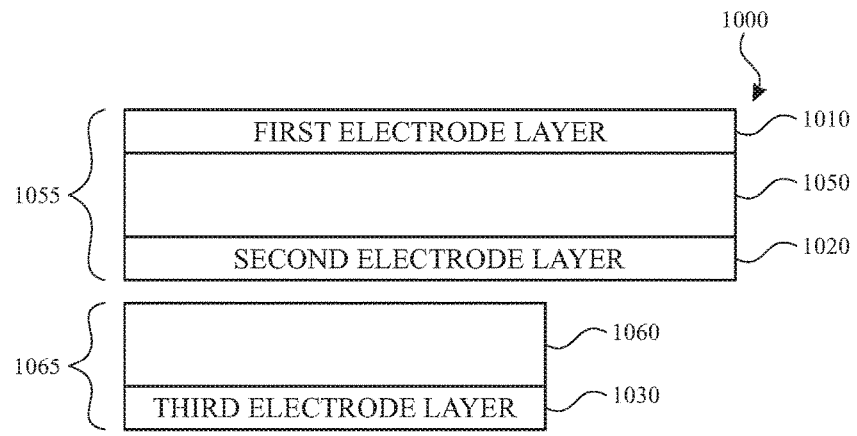
FIGS. 10A-10F illustrate cross-sectional views of an exemplary touch screen during a manufacturing process according to examples of the disclosure.

FIG. 10A illustrates exemplary touch screen 1000 during a first stage of manufacturing according to examples of the disclosure. Touch screen 1000 can include a two-layer structure 1055 formed on a first substrate 1050 and a one-layer structure 1065 formed on a second substrate 1060. Two-layer structure can include first electrode layer 1010 (e.g., a top shielding layer), first substrate 1050, and second electrode layer 1020 (e.g., a touch sensing layer). One-layer structure 1065 can include second substrate 1060 and third electrode layer 1030 (e.g., a bottom shielding layer). Substrates 1050 and/or 1060 can include a material (e.g., a transparent and/or insulating material) to provide structural support to one or more layers or materials on the substrate (e.g., one or more electrode layers or other components), for example. In some examples, substrates 1050 and/or 1060 can include multiple substrate layers joined by adhesive(s). First electrode layer 1010 can include a top shielding electrode, which can be a patterned shielding electrode (e.g., top shielding electrode 612). Second electrode layer 1020 can include a plurality of touch electrodes. Third electrode layer can include one or more second shielding electrodes. In some examples, first electrode layer 1010 and second electrode layer 1020 can include one or more electrodes including ITO and two-layer structure can be a DITO layer. Likewise, in some examples, third electrode layer 1030 can include one or more electrodes including ITO, and one-layer structure 1065 can be a SITO layer. In some examples, first electrode layer 1010, second electrode layer 1020, and third electrode layer 1030 can include electrodes including another transparent, semi-transparent, or opaque conductive material. During a first stage of manufacture, the two-layer structure 1055 and one layer structure 1065 are provided for use in the subsequent manufacturing steps.

Figure 10B:
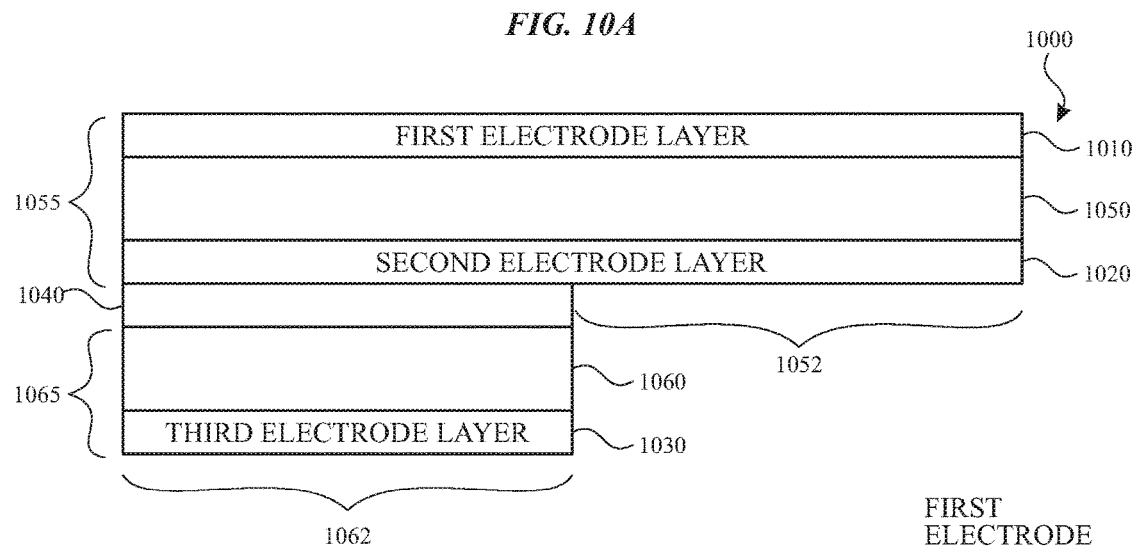

FIG. 10B illustrates exemplary touch screen 1000 at a second stage of manufacturing according to examples of the disclosure. Two-layer structure 1055 and one layer structure 1065 can be joined using adhesive 1040 (e.g., during a lamination process), for example. The section of touch screen 1000 where two-layer structure 1055 and one-layer structure 1065 are joined can be an overlapping section 1062 of the touch screen. In some examples, the two-layer structure 1055 can include an overhanging section 1052 that extends beyond the one-layer structure 1065. In some examples, the overhanging section 1052 can be placed in a bond pad region of the touch screen 1000 (e.g., bond pad region(s) 750 of touch screen 700 illustrated in FIGS. 7A-F).

Figure 10C:
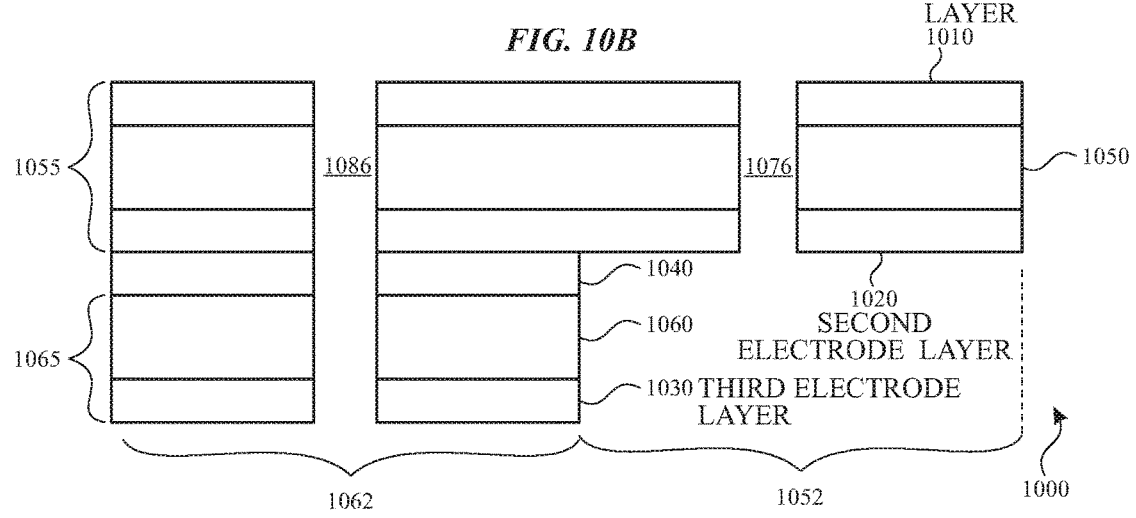

FIG. 10C illustrates exemplary touch screen 1000 at a third stage of manufacturing according to examples of the disclosure. During the third stage of manufacturing, a first hole 1076 can be drilled through the two-layer structure 1055 at a position in the overhanging section 1052 of touch screen 1000, and a second hole 1086 can be drilled through both the two-layer structure 1055 and the one layer structure 1065 in the overlapping section 1062 of touch screen 1000. In some examples, the first hole 1076 and the second hole 1086 can be formed using laser ablation. For example, a ring-shaped cut can be made through touch screen 1000, causing a truncated cone-shaped peg to be formed. The peg can be ejected (e.g., using air) from the hole afterwards, for example, leaving behind hole 1076 or 1086. In some examples, the holes 1076 and 1086 can be formed by first drilling a small hole, then gradually increasing the size of the hole. Regardless of which drilling technique is used, several characteristics of the laser can be controlled to ensure a clean cut without damaging any of the layers of touch screen 1000. For example, the temperature can be controlled to avoid melting adhesive 1040 or any other component of touch screen 1000. In some examples, holes 1076 and 1086 can be formed using alternative methods other than laser ablation. In some examples, two-layer structure 1055 and one-layer structure 1065 can be formed with holes, and the holes can be aligned when the structures are adhered.

Figure 10D:
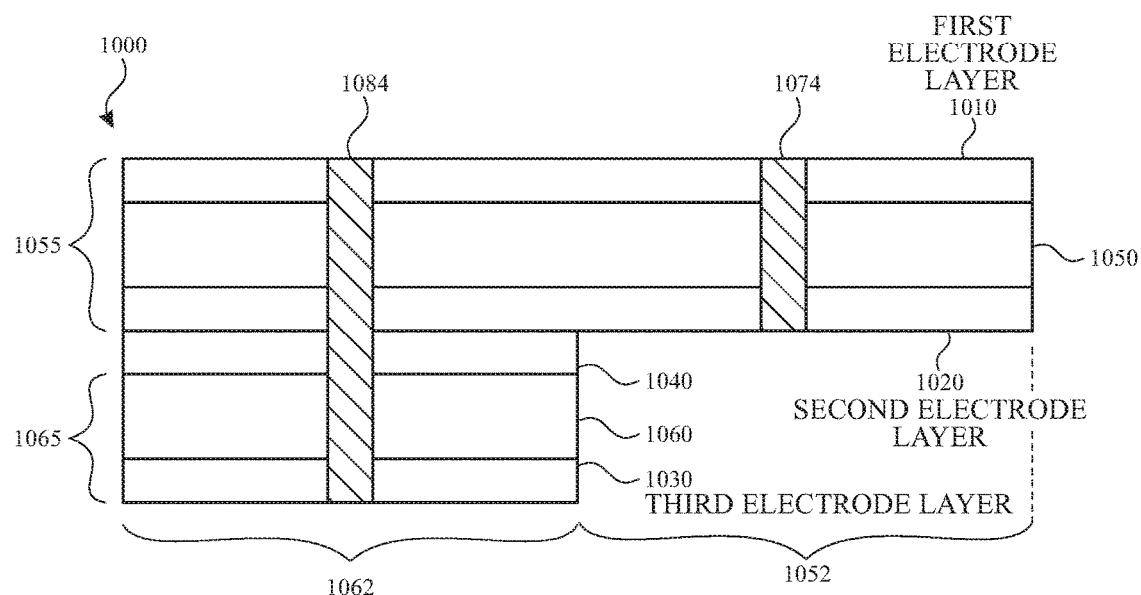

FIG. 10D illustrates exemplary touch screen 1000 at a fourth stage of manufacturing according to examples of the disclosure. During the fourth stage of manufacturing, the first hole 1076 and second hole 1086 can be filled with a conductive paste to begin to form two conductive vias. A middle section 1074 of a shield-sensor via can be formed in the first hole positioned in the overhanging section 1052 of the touch screen 1000. Likewise, a middle section 1084 of a shield-shield via can be formed in the second hole positioned in the overlapping section 1062 of the touch screen 1000. In some examples, the conductive paste can be filled from one side of the touch screen 1000 (e.g., from the side having first electrode layer 1010 or from the side having second electrode layer 1020 and third electrode layer 1030). In some examples, the conductive paste can be filled from both sides of the touch screen 1000 simultaneously or sequentially.

Figure 10E:
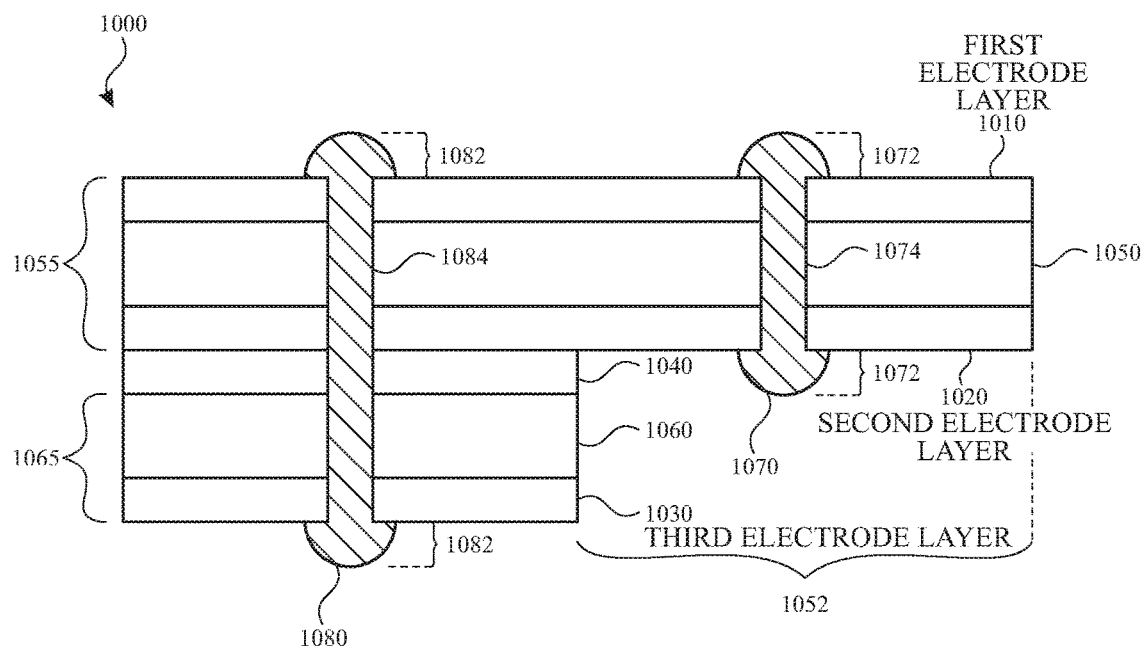
Figure 10F:
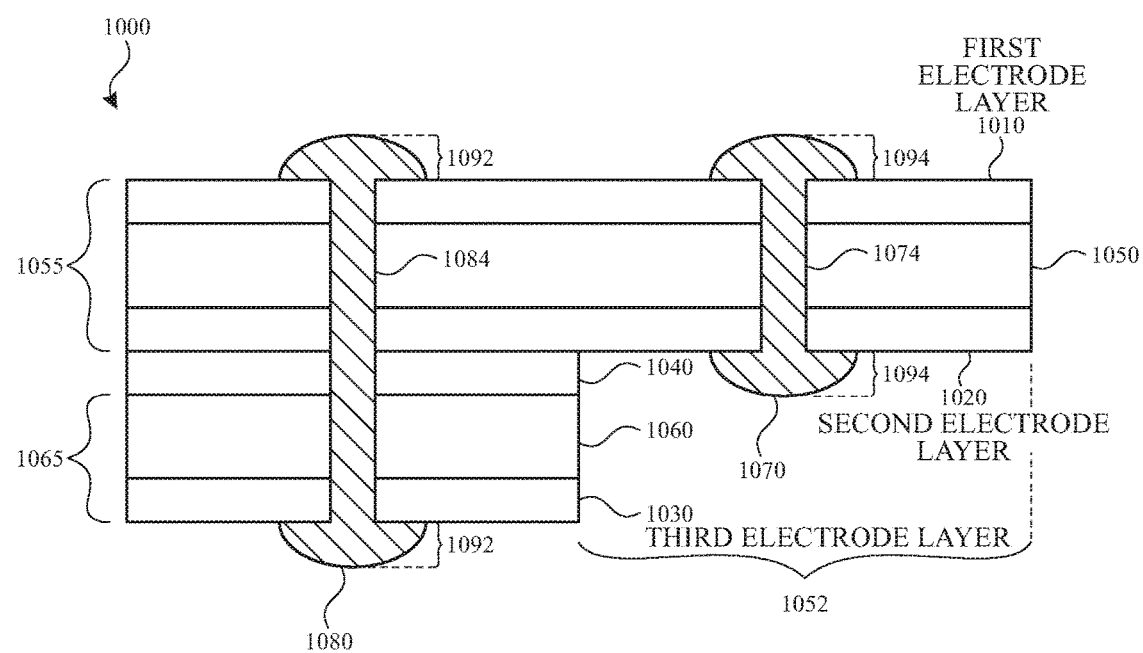

FIGS. 10E and 10F illustrate exemplary touch screen 1000 at a fifth stage of manufacturing according to examples of the disclosure. During the fifth stage of manufacturing, endcaps 1072 or 1094 of shield-sensor via 1070 and endcaps 1082 or 1092 of shield-shield via 1080 can be formed. In some examples, endcaps 1072, 1082, 1092, and 1094 can be formed while middle sections 1074 and 1084 are being formed. For example, one or more holes (e.g., holes 1076 and/or 1086) can be overfilled with conductive paste so that the middle portions 1074 and 1084 overfill to form endcaps 1072, 1082, 1092, and 1094. Endcaps 1072 and 1094 of shield-sensor via 1070 can form electrical connections to first electrode layer 1010 and second electrode layer 1020. Likewise, endcaps 1082 and 1092 of shield-shield via 1080 can form electrical connections to first electrode layer 1010 and third electrode layer 1082. By positioning the shield-sensor via 1070 in the overhanging section 1052 of touch screen 1000, a surface of second electrode layer 1020 may be exposed, allowing an endcap 1072 or 1094 to be formed in contact with the second electrode layer 1020. Endcaps 1072, 1082, 1092, and 1094 can be formed when the holes (e.g., holes 1076 and 1086) are filled from one side of touch screen 1000 or when the holes are filled from both sides of the touch screen sequentially or simultaneously. In some examples, endcaps 1072,1082, 1092, and 1094 can include any electrical structure that forms an electrical connection between the respective electrode layer to make contact with the center portion (e.g., center portion 1074 or 1084) of the respective via of the endcap. That is to say, endcaps 1072, 1082, 1092, and 1094 need not be cap-shaped, though in some examples they may be.

Although FIGS. 10E and 10F illustrate cross-sectional views of touch screen 1000, it should be noted that the top view structure of via endcaps 1072, 1082, 1092, and 1094 can vary. For example, endcaps 1072 and 1082 can be circular endcaps (e.g., as illustrated in FIGS. 7A, 7C, and 7E above) and endcaps 1092 and 1094 can be oval endcaps with extended structure in one dimension (e.g., as illustrated in FIGS. 7B, 7D, and 7F). FIGS. 7B, 7D, and 7F illustrate a cross-section of touch screen 1000 across the dimension in which oval endcaps 1092 and 1094 are extended, for example. Although FIGS. 7B, 7D, and 7F illustrate endcaps 1092 and 1094 as being extended in the same dimension, in some examples, one or more endcaps 1092 and/or 1094 can be extended in different dimensions. In some examples, vias 1070 and 1080 can include oval endcaps 1092 and 1094 on both sides, as illustrated in FIG. 10F (e.g., the fifth step in the manufacturing process can be performed as illustrated in FIG. 10F). In some examples, vias 1070 and 1080 can include oval endcaps 1092 and 1094 on one side and circular endcaps 1072 and 1082 on another side (e.g., the fifth step in the manufacturing process can be performed in some ways as illustrated in FIG. 10E and in some ways as illustrated in FIG. 10F). In some examples, vias 1070 and 1080 can include circular endcaps 1072 and 1082 on both sides (e.g., the fifth step in the manufacturing process can be performed as illustrated in FIG. 10E).

Although specific stages of manufacturing have been described with reference to FIGS. 10A-10F, it should be understood that in some examples, additional or alternative stages of manufacturing can be used. Further, the aforementioned stages can be performed in an order different from the order in which the stages are described. For example, shield-sensor via 1070 can be formed on two-layer structure 1055 before the two-layer structure and the one-layer structure 1065 are joined by adhesive 1040. Other modifications to the manufacturing process are possible. Further, touch screen 1000 can include additional components to those described here. For example, one or more passivation layers and/or additional substrates can be added to touch screen 1000. In some examples, touch screen 1000 can include one or more additional electrode layers (e.g., to accommodate row and column touch electrodes, such as those illustrated in FIG. 4A). Other additional components are possible.

Figure 11:
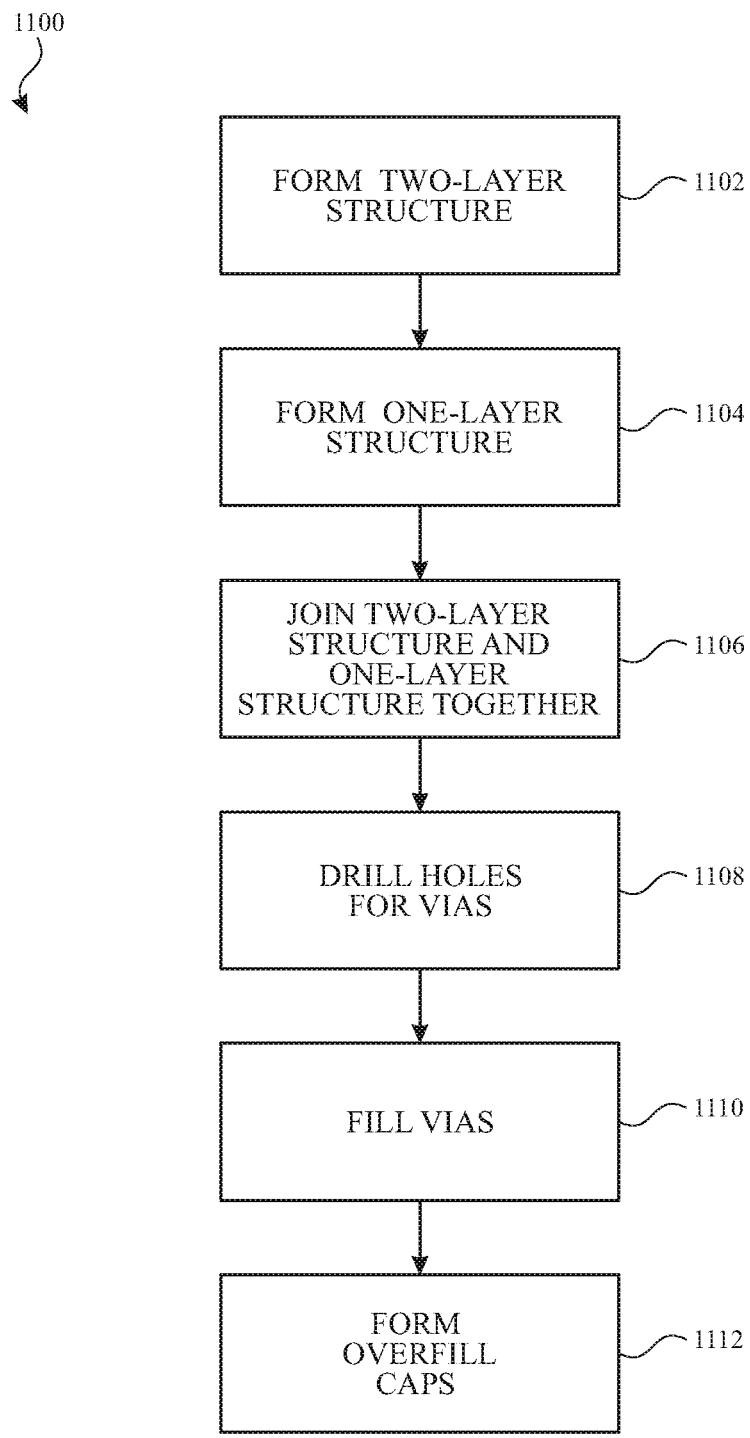
FIG. 11 illustrates an exemplary process flow for forming a touch screen according to examples of the disclosure.

FIG. 11 illustrates an exemplary process flow 1100 for forming a touch screen according to examples of the disclosure. At step 1102, a two-layer structure (e.g., two-layer structure 1055) can be formed. At step 1104, a one-layer structure (e.g., one-layer structure 1065) can be formed. Steps 1102 and 1104 can correspond to FIG. 10A described above. At step 1106, the two-layer structure and one-layer structure can be joined together using, for example, an adhesive (e.g., adhesive 940 or 1040), as illustrated in FIG. 10B above. At step 1108, holes (e.g., 1076 and 1086) can be drilled through the touch screen (e.g., touch screen 1000) for vias (e.g., vias 970, 980, 1070, and/or 1080), as described above with reference to FIG. 10C. At step 1110, the vias can be filled as described above with reference to FIG. 10D. At step 1112, the via endcaps (e.g., endcaps 972, 982, 1072, and/or 1082) can be formed, as illustrated in FIG. 10E. In some examples, additional or alternative steps are possible. Further, although steps 1102-1112 have been described in a particular order, in some examples, the steps can be performed in different orders and/or two or more steps may be performed concurrently. In some examples, the touch screen can further include one or more passivation or conformal layers, as will be described below with reference to FIGS. 12-13.

Figure 12A:
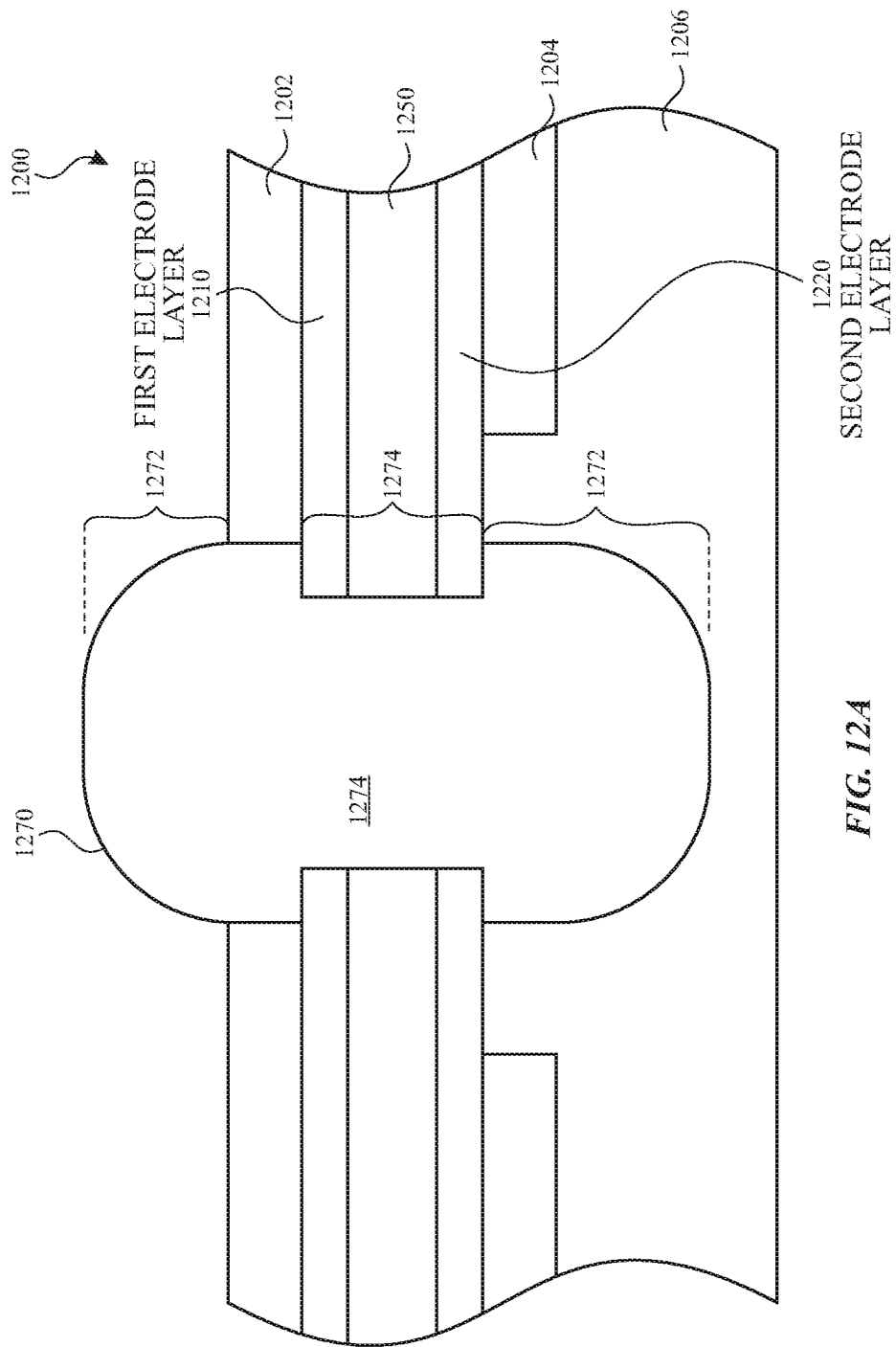
FIGS. 12A-B illustrate cross-sectional views of a portion of an exemplary touch screen including passivation layers and a via between electrode layers according to examples of the disclosure.
Figure 12B:
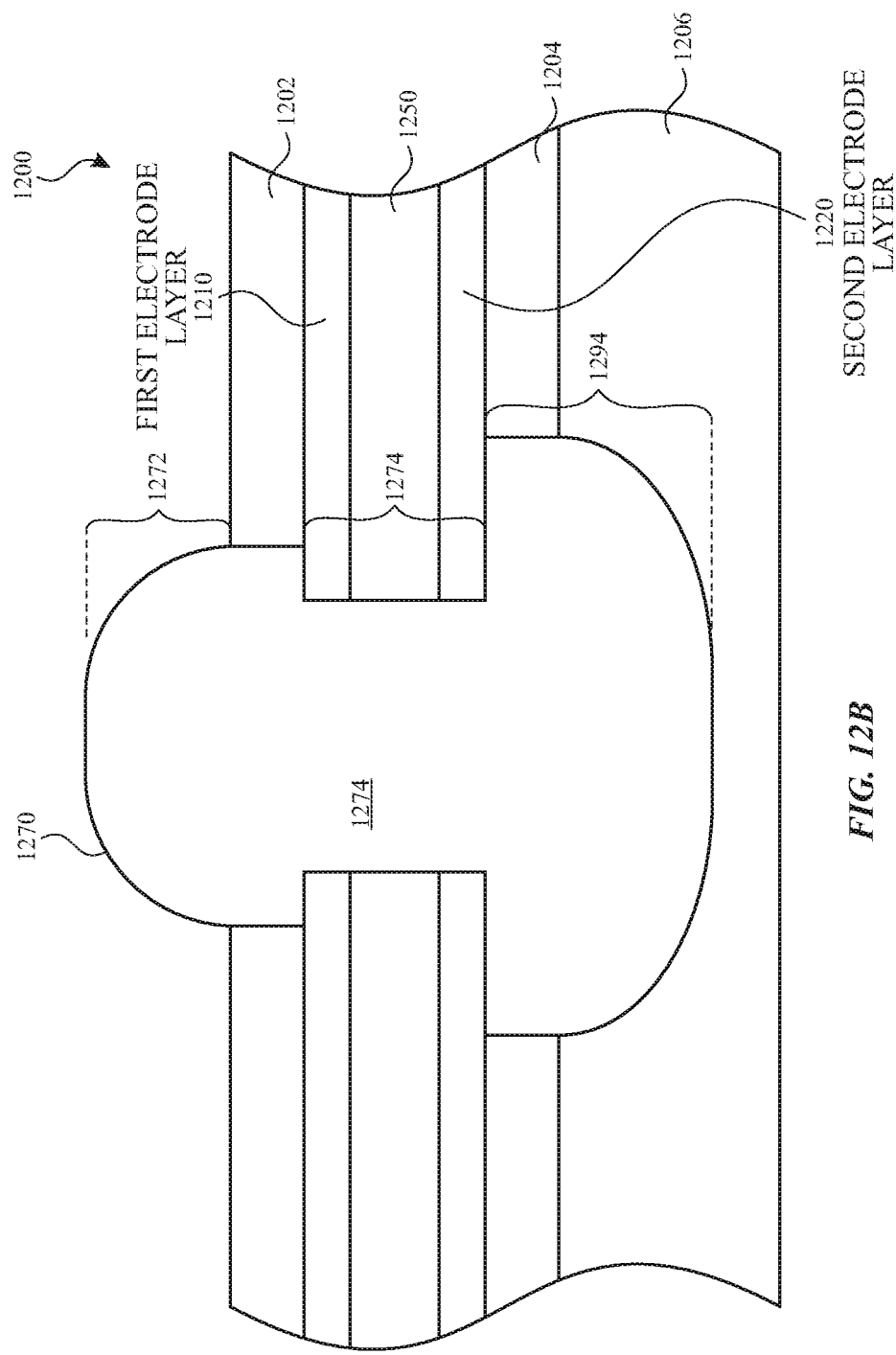

FIGS. 12A and 12B illustrate cross-sectional views of a portion of an exemplary touch screen 1200 including passivation layers 1202 and 1204 and a via 1270 between electrode layers 1210 and 1220 according to examples of the disclosure. Touch screen 1200 can include a first electrode layer 1210 (e.g., a top shielding layer), a second electrode layer 1220 (e.g., a touch sensing layer), substrate 1250, via 1270, first passivation layer 1202, second passivation layer 1204, and conformal layer 1206. Via 1270 can include endcaps 1272 or 1294 and center portion 1274, for example. In some examples, endcaps 1272 or 1294 can form electrical connections to the first electrode layer 1210 and the second electrode layer 1220 and can be electrically coupled by center portion 1274.

In some examples, when a hole is drilled through touch screen 1200 during manufacture, the hole can be wider at the first passivation layer 1202 than it is at the first electrode layer 1210, thereby exposing part of the first electrode layer 1210 so that it can contact an endcap 1272 of via 1270. As shown in FIG. 12A, one of the endcaps 1272 of via 1270 completely covers the exposed portion of the first electrode layer 1210 that does not overlap with the first passivation layer 1202. Accordingly, the first electrode layer 1210 can be completely covered by first passivation layer 1202 and an endcap 1272 of via 1270, thereby protecting the first electrode layer from corrosion, for example. In some examples, via 1270 and/or first passivation layer 1202 can include corrosion-resistant materials to protect touch screen 1200.

In some examples, the hole can be even wider across second passivation layer 1204 than it is across first passivation layer 1202, as shown in FIG. 12A. Part of an exposed portion of the second electrode layer 1220 can contact an endcap 1272 of via 1270 to form an electrical connection. In some examples, there can be an exposed portion of the second electrode layer 1220 that lies between the endcap 1272 of via 1270 and the second passivation layer 1204. To protect this exposed portion of the second electrode layer 1220, an additional conformal layer 1206 can be placed on top of the second electrode layer 1220, the endcap 1272 of via 1270, and the second passivation layer 1204 to completely cover the second electrode layer 1220 and protect the touch screen 1200 from corrosion.

As shown in FIG. 12B, both of first electrode layer 1210 and second electrode layer 1220 can be protected entirely by the endcaps 1272 and 1294 of via 1270 in some example. For example, endcap 1294 can be an oval endcap with an extended structure in one dimension (e.g., as illustrated in FIGS. 7B, 7D, and 7F). In this way, endcap 1294 can cover all or part (e.g., in the dimension in which endcap 1294 is extended) of the second electrode layer 1220 not in contact with passivation layer 1204, for example. In some examples, conformal layer 1206 can be placed on top of endcap 1294 to cover endcap 1294 and/or to cover part of the second electrode layer 1220 not covered by endcap 1294 (e.g., in the dimension in which endcap 1294 is not extended).

Further, in some examples, both of the first electrode layer 1210 and the second electrode layer 1220 can include exposed portions between endcaps 1272 or 1294 and the first passivation layer 1202 and second passivation layer 1204, respectively. In some examples, both sides of touch screen 1200 can include an additional conformal layer (e.g., conformal layer 1206) to protect the first electrode layer 1210 and the second electrode layer 1220. Although via 1270 is illustrated as connecting the first electrode layer 1210 and the second electrode layer 1220, similar techniques can be used to protect a third electrode layer (e.g., third electrode layer 930 or 1030) using an endcap of a shield-shield via (e.g., shield-shield via 980 connecting first electrode layer 910 and third electrode layer 930 or shield-shield via 1080 connecting first electrode layer 1010 and third electrode layer 1030). Likewise, in some examples, additional passivation layers and/or conformal layers can be placed to cover the third electrode layer of a touch screen according to examples of the disclosure.

In some examples, substrate 1250 can include a material (e.g., a transparent and/or insulating material) that provides structural support to additional materials and/or layers of touch screen 1200. Substrate 1250 can include a plurality of substrates joined by adhesive(s). The process for forming a touch screen 1200 as illustrated in FIG. 12A with passivation layers 1202 and 1204 and conformal layer 1206 will now be described with reference to FIGS. 13A-13D. The process for forming a touch screen 1200 as illustrated in FIG. 12B with passivation layers 1202 and 1204 and conformal layer 1206 will be described below with reference to FIGS. 14A-14D.

FIGS. 13A-13D illustrate cross-sectional views of a portion of an exemplary touch screen 1300 including two passivation layers and a via between two electrode layers during a manufacturing process according to examples of the disclosure. In some examples, touch screen 1300 can include some or all of the same components as touch screen 900, 1000, and/or 1200. It should be understood that touch screen 900, 1000, and/or 1200 can be manufactured using one or more of the steps described with reference to FIGS. 13A-13D.

Figure 13A:
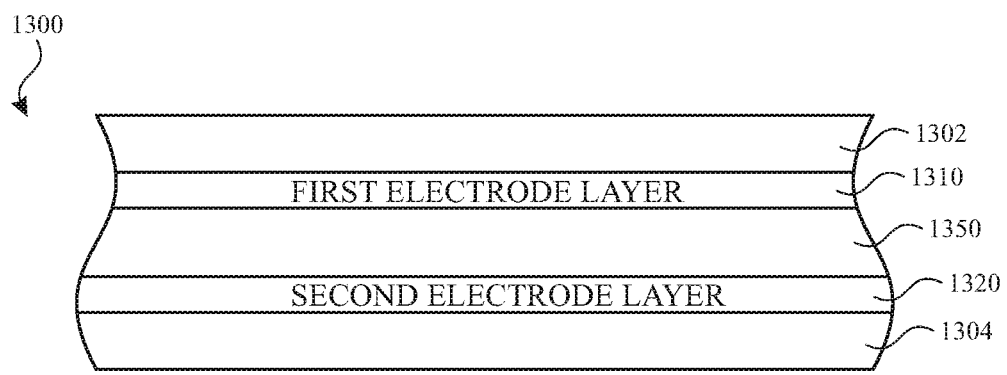
FIGS. 13A-13D illustrate cross-sectional views of a portion of an exemplary touch screen including passivation layers and a via between electrode layers during a manufacturing process according to examples of the disclosure.

FIG. 13A illustrates a partial view of exemplary touch screen 1300 during a first stage of a manufacturing process according to examples of the disclosure. In some examples, touch screen 1300 can include a first electrode layer 1310 (e.g., a top shielding layer), a second electrode layer 1320 (e.g., a touch sensing layer), a substrate 1350, a first passivation layer 1302, and a second passivation layer 1304. In some examples, first electrode layer 1310, second electrode layer 1320, and substrate 1350 can form a two-layer structure. When first electrode layer 1310 and second electrode layer 1320 include electrodes including ITO, the two-layer structure can be a DITO layer. In some examples, first electrode layer 1310 and/or second electrode layer 1320 can include electrodes including other transparent, semi-transparent and/or opaque conductive materials.

Figure 13B:
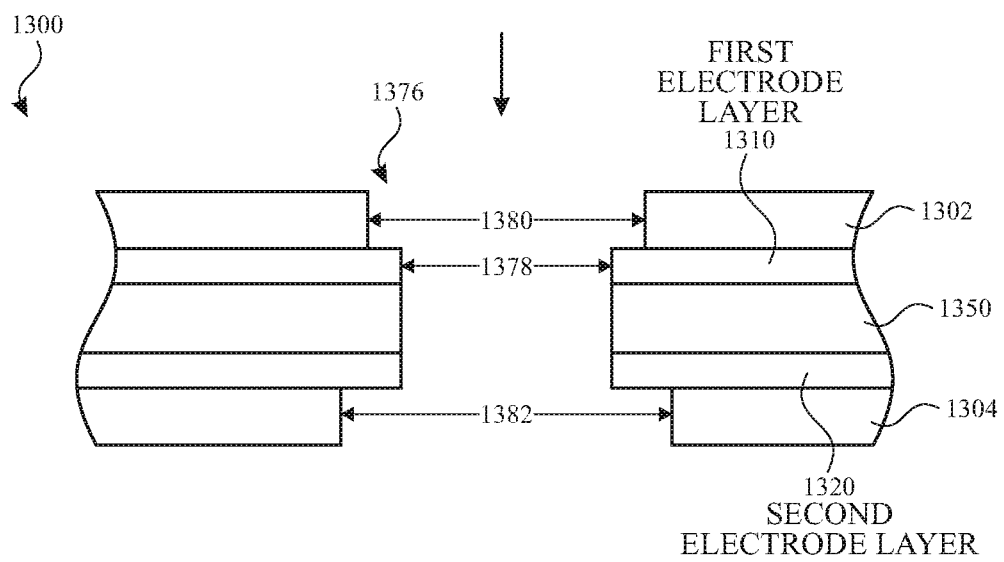

FIG. 13B illustrates a partial view of exemplary touch screen 1300 during a second stage of a manufacturing process according to examples of the disclosure. During the second stage, a hole 1376 can be formed in the touch screen 1300 using laser ablation or another suitable drilling technique. In some examples, the hole 1376 can have a first diameter 1378 across the first electrode layer 1310, which can be smaller than a second diameter 1380 across the first passivation layer 1302. The hole 1376 can have its largest diameter 1382 across the second passivation layer 1304. By forming hole 1376 so that it is larger across the passivation layers 1302 and 1304 than it is across the electrode layers 1310 and 1320, portions of the electrode layers 1310 and 1320 can be exposed to form electrical connections with a via, as will be described below.

Figure 13C:
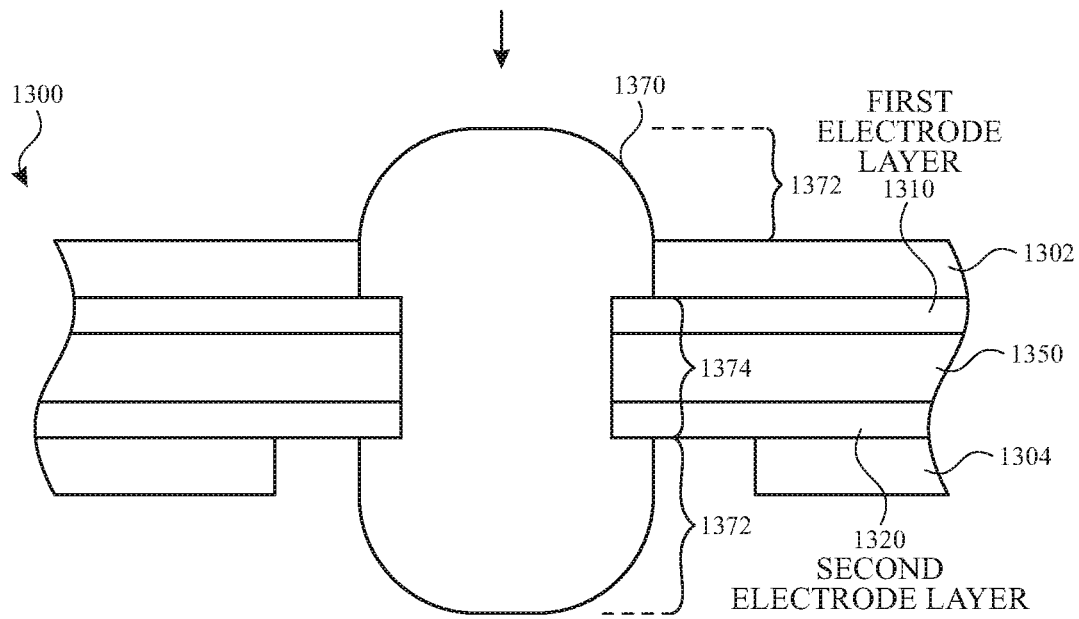

FIG. 13C illustrates a partial view of exemplary touch screen 1300 during a third stage of a manufacturing process according to examples of the disclosure. During the third stage, a via 1370 can be formed to fill hole 1376, for example. In some examples, via 1370 can include endcaps 1372. One of the endcaps 1372 can form an electrical connection to the first electrode layer 1310. Another of the endcaps 1372 can form an electrical connection to the second electrode layer 1320. In some examples, the endcaps 1372 can be electrically connected to one another by center portion 1374. As shown in FIG. 13C, one of the endcaps 1372 can completely overlap an exposed portion of first electrode layer 1310 that may not be covered by first passivation layer 1302. Via endcap 1372 and first passivation layer 1302 can include non-corrosive materials, thereby protecting first electrode layer 1302 from corrosion. One of the endcaps 1372 can overlap part of an exposed portion of the second electrode layer 1320, which can leave an exposed region of the second electrode layer between the via endcap and the second passivation layer 1304.

Figure 13D:
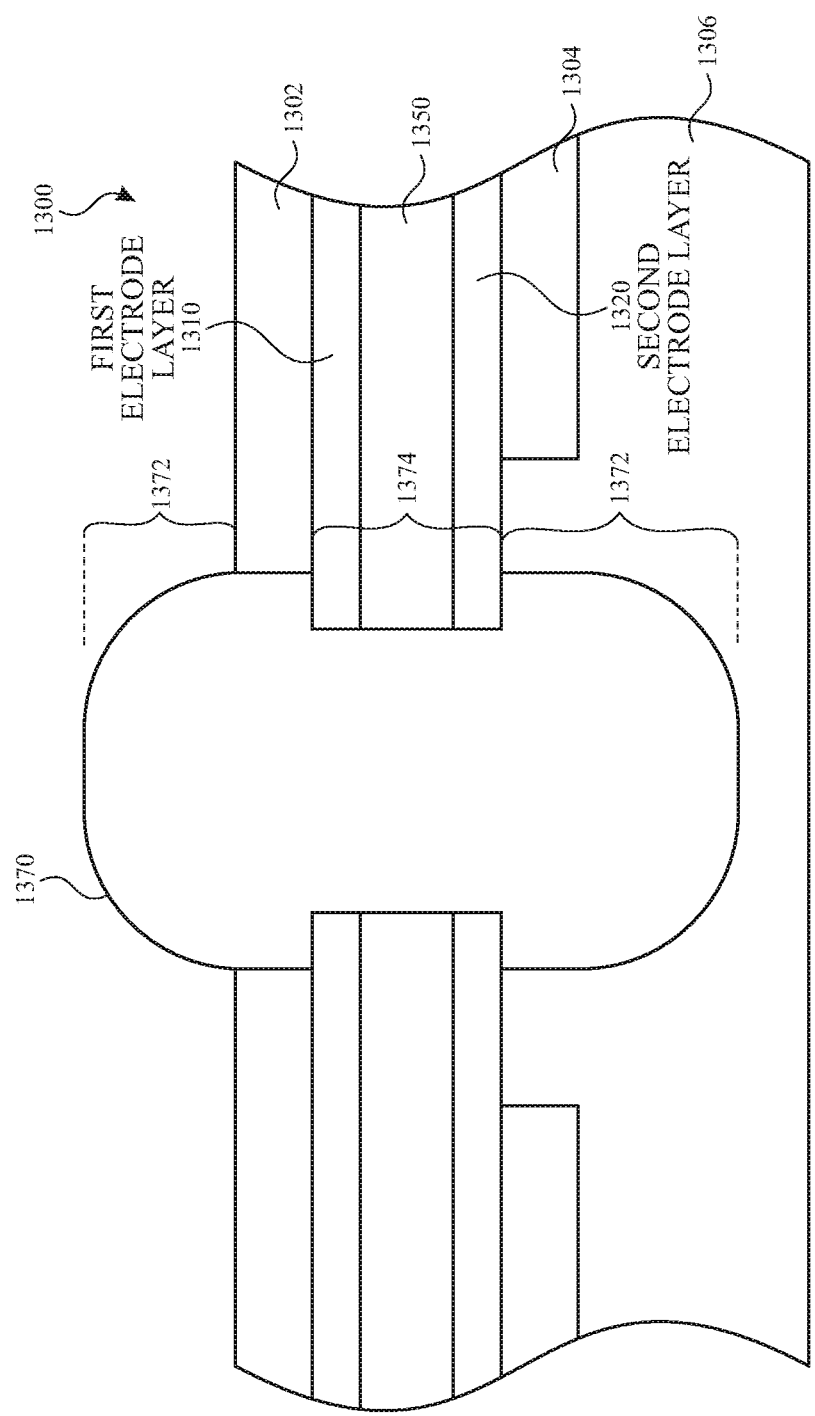

FIG. 13D illustrates a partial view of exemplary touch screen 1300 during a fourth stage of a manufacturing process according to examples of the disclosure. During the fourth stage, a conformal layer 1306 can be formed to cover the second electrode layer 1320 and the second passivation layer 1304. Conformal layer 1306 can include a non-corrosive material, thereby protecting second electrode layer 1320.

Although the stages of a manufacturing process have been described with reference to FIGS. 13A-13D, in some examples, additional or alternative stages and/or steps are possible. Further, one or more stages of the manufacturing process described with reference to FIGS. 13A-13D can be used to form a touch screen including additional or alternative components to those included in touch screen 1300. For example, touch screen 1300 can include additional adhesives, substrates, passivation layers, and/or conformal layers not illustrated. In some examples, touch screen 1300 can include additional electrode layers (e.g., to accommodate row and column touch electrodes as illustrated in FIG. 4A).

FIGS. 14A-14D illustrate cross-sectional views of a portion of an exemplary touch screen 1400 including two passivation layers and a via between two electrode layers during a manufacturing process according to examples of the disclosure. In some examples, touch screen 1400 can include some or all of the same components as touch screen 900, 1000, and/or 1200. It should be understood that touch screen 900, 1000, and/or 1200 can be manufactured using one or more of the steps described with reference to FIGS. 14A-14D.

Figure 14A:
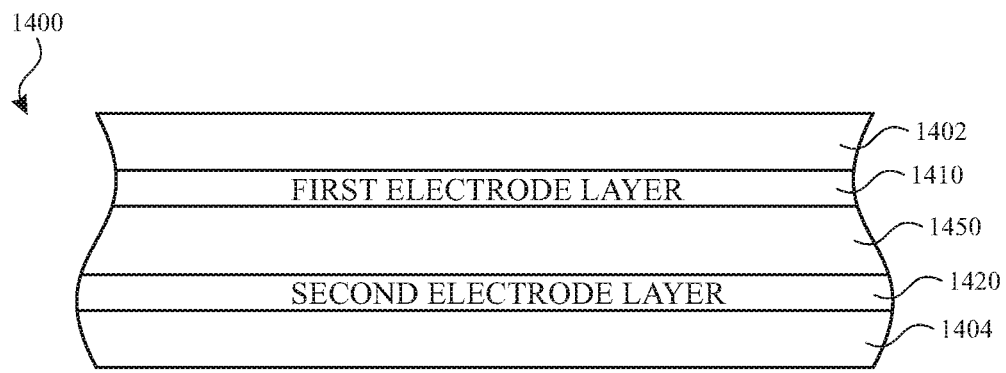
FIGS. 14A-14D illustrate cross-sectional views of a portion of an exemplary touch screen including passivation layers and a via between electrode layers during a manufacturing process according to examples of the disclosure.

FIG. 14A illustrates a partial view of exemplary touch screen 1400 during a first stage of a manufacturing process according to examples of the disclosure. The first stage illustrated in FIG. 14A can be similar to the first stage illustrated in FIG. 13A above. Touch screen 1400 can include a first electrode layer 1410 (e.g., a top shielding layer similar to first electrode layer 1310), a second electrode layer 1420 (e.g., a touch sensing layer similar to second electrode layer 1320), a substrate 1450 (e.g., similar to substrate 1350, a first passivation layer 1402 (e.g., similar to first passivation layer 1302), and a second passivation layer 1404 (e.g., similar to second passivation layer 1304). In some examples, first electrode layer 1410, second electrode layer 1420, and substrate 1450 can form a two-layer structure. When first electrode layer 1410 and second electrode layer 1420 include electrodes including ITO, the two-layer structure can be a DITO layer. In some examples, first electrode layer 1410 and/or second electrode layer 1420 can include electrodes including other transparent, semi-transparent and/or opaque conductive materials.

Figure 14B:
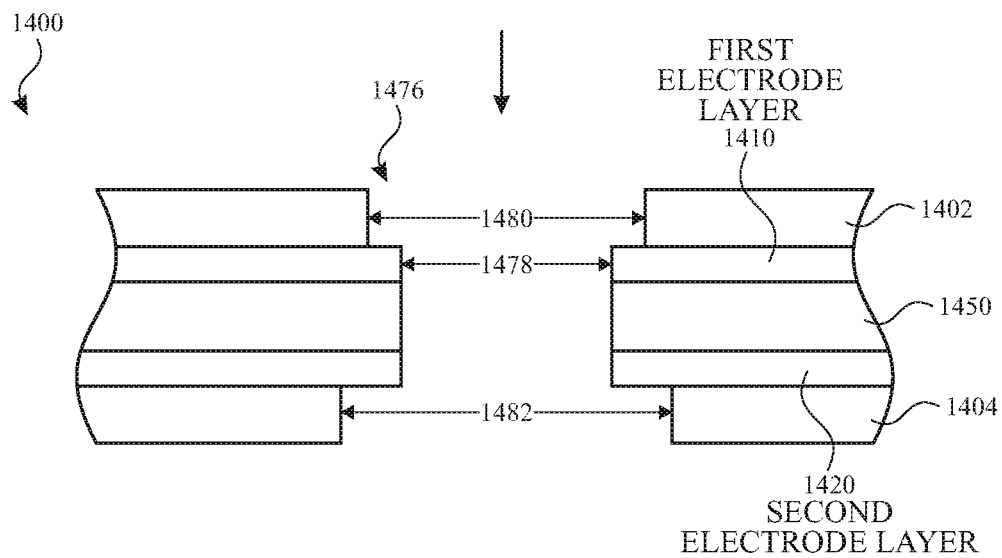

FIG. 14B illustrates a partial view of exemplary touch screen 1400 during a second stage of a manufacturing process according to examples of the disclosure. The second stage illustrated in FIG. 14B can be similar to the second stage illustrated in FIG. 13B above. During the second stage, a hole 1476 can be formed in the touch screen 1400 using laser ablation or another suitable drilling technique. In some examples, the hole 1476 can have a first diameter 1478 across the first electrode layer 1410, which can be smaller than a second diameter 1480 across the first passivation layer 1402. The hole 1476 can have its largest diameter 1482 across the second passivation layer 1404. By forming hole 1476 so that it is larger across the passivation layers 1402 and 1404 than it is across the electrode layers 1410 and 1420, portions of the electrode layers 1410 and 1420 can be exposed to form electrical connections with a via, as will be described below.

Figure 14C:
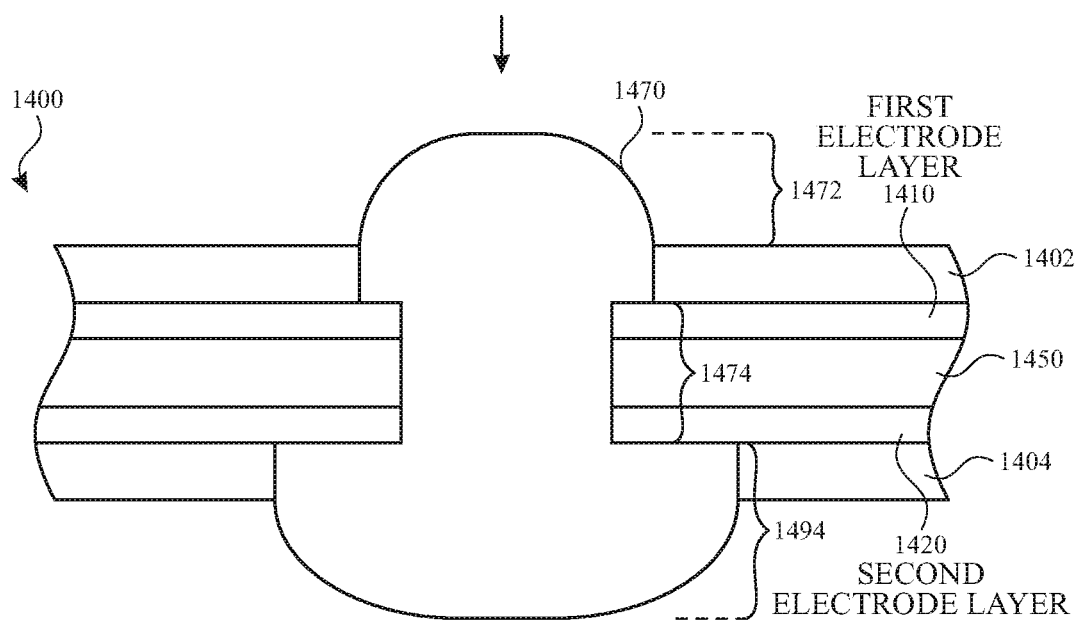

FIG. 14C illustrates a partial view of exemplary touch screen 1400 during a third stage of a manufacturing process according to examples of the disclosure. The third stage illustrated in FIG. 14C can be similar to the third stage illustrated in FIG. 13C above. During the third stage, a via 1470 can be formed to fill hole 1476, for example. In some examples, via 1470 can include endcaps 1472 and 1494. One of the endcaps 1472 can form an electrical connection to the first electrode layer 1410. Another of the endcaps 1494 can form an electrical connection to the second electrode layer 1420. In some examples, the endcaps 1472 can be electrically connected to one another by center portion 1474. As shown in FIG. 14C, one of the endcaps 1472 can completely overlap an exposed portion of first electrode layer 1410 that may not be covered by first passivation layer 1402. Via endcap 1472 and first passivation layer 1402 can include non-corrosive materials, thereby protecting first electrode layer 1402 from corrosion. As illustrated in FIG. 14C, via 1470 can include at least one oval endcap 1494 with extended structure in one dimension (e.g., as illustrated in FIGS. 7B, 7D, and 7F above). In this way, endcap 1494 can cover all or part (e.g., in the dimension in which endcap 1494 is extended) of the second electrode layer 1420 not in contact with passivation layer 1404, for example. In some examples, vias 1470 can include an oval endcap 1494 on one side and a circular endcap 1472 on the other side. In some examples, vias 1470 can include oval endcaps such as endcap 1494 on both sides.

Figure 14D:
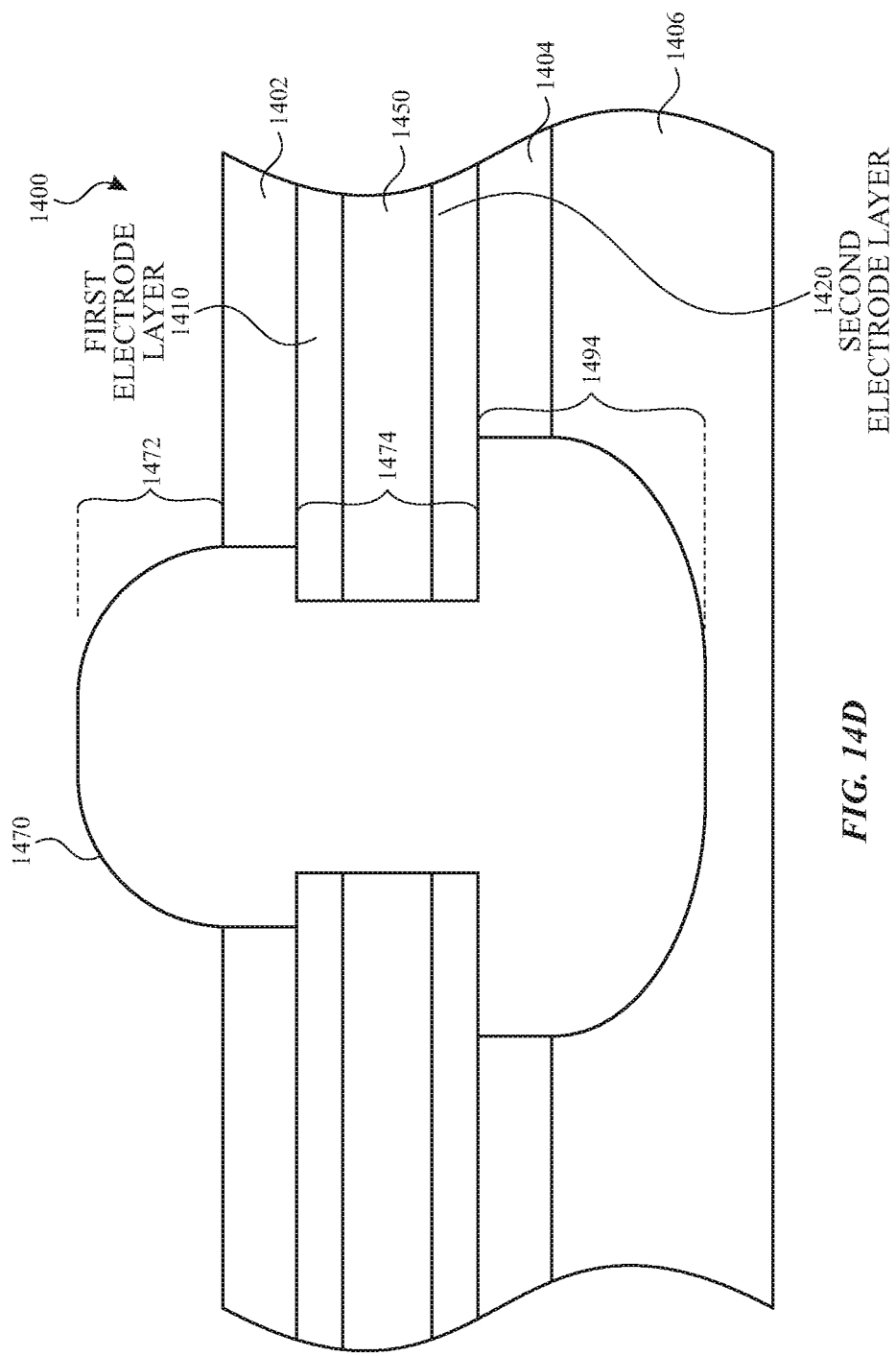

FIG. 14D illustrates a partial view of exemplary touch screen 1400 during a fourth stage of a manufacturing process according to examples of the disclosure. The fourth stage illustrated in FIG. 14D can be similar to the fourth stage illustrated in FIG. 13D above. During the fourth stage, a conformal layer 1406 can be formed to cover part, if any, of the second electrode layer 1420 not covered by passivation layer 1404, and the second passivation layer 1404. Conformal layer 1406 can include a non-corrosive material, thereby protecting part, if any, of second electrode layer 1420 and/or the via endcap 1494.

Although the stages of a manufacturing process have been described with reference to FIGS. 14A-14D, in some examples, additional or alternative stages and/or steps are possible. Further, one or more stages of the manufacturing process described with reference to FIGS. 14A-14D can be used to form a touch screen including additional or alternative components to those included in touch screen 1400. For example, touch screen 1400 can include additional adhesives, substrates, passivation layers, and/or conformal layers not illustrated. In some examples, touch screen 1400 can include additional electrode layers (e.g., to accommodate row and column touch electrodes as illustrated in FIG. 4A).

Therefore, according to the above, some examples of the disclosure are related to a touch sensor panel comprising a first electrode layer comprising a first shielding electrode; a second electrode layer comprising one or more touch electrodes coupled to one or more routing traces; a third electrode layer comprising a second shielding electrode; a bond pad region comprising a plurality of connections to the one or more routing traces, the connections in the bond pad region different from connections between the one or routing traces and the one or more touch electrodes; a plurality of vias comprising: one or more first vias electrically coupling the first electrode layer and the second electrode layer, the one or more shield-sensor vias placed within the bond pad region; and one or more second vias electrically coupling the first electrode layer and the third electrode layer, wherein the second electrode layer is placed between the first electrode layer and the third electrode layer. Additionally or alternatively, in some examples, the one or more routing traces are coupled to touch sensing circuitry by way of the connections in the bond pad region. Additionally or alternatively, in some examples, each of the one or more routing traces comprises a first conductive portion in an inner region of the touch sensor panel and a second conductive portion in an outer region of the touch sensor panel, the outer region located around the inner region, wherein: the first conductive portions have a lower conductivity than the second conductive portions, and the one or more second vias are located in the outer region. Additionally or alternatively, in some examples, the one or more routing traces comprises a first routing trace coupled to a first touch electrode, the first touch electrode is a first distance from one of the one or more second vias, the first conductive portion of the first routing trace is longer than the first distance such that the first routing trace is separated from the one of the one or more second vias by at least a threshold distance. Additionally or alternatively, in some examples, the one or more routing traces comprises a first routing trace coupled to a first touch electrode, the first touch electrode is a first distance from one of the one or more second vias, the first routing trace further comprises a third conductive portion, the one of the one or more second vias placed between the third conductive portion and the second conductive portion, the first conductive portion of the first routing trace comprises a diverted portion connected to the second conductive portion and the third conductive portion such that the first routing trace is separated from the one of the one or more second vias by at least a threshold distance. Additionally or alternatively, in some examples, the first conductive portions include ITO and the second conductive portions include copper. Additionally or alternatively, in some examples, the touch sensor panel further includes an inner region, the inner region including the one or more touch electrodes; and a first opaque mask around the inner region, the first opaque mask comprising one or more notches, wherein the one or more second vias are placed in the one or more notches of the first opaque mask. Additionally or alternatively, in some examples, the touch sensor panel further includes a cover material located on an opposite side of the first electrode layer than the second electrode layer; and a second opaque mask placed on the cover material, the second opaque mask having an interior edge and an exterior edge, the interior edge located further from the one or more touch electrodes than an interior edge of the first opaque mask. Additionally or alternatively, in some examples, the touch sensor panel further includes a passivation layer placed on the first electrode layer and second electrode layer such that the first electrode layer is between the passivation layer and the second electrode layer, wherein: the first electrode layer includes a first hole, the second electrode layer includes a second hole, the passivation layer includes a third hole larger than the first hole, the first hole, second hole, and third hole overlap one another, and at least one of the one or more first vias placed within the first hole, second hole, and third hole comprises an endcap in contact with the first electrode layer, the endcap overlapping a region of the first electrode layer exposed by the third hole in the passivation layer. Additionally or alternatively, in some examples, the touch sensor panel further comprises a passivation layer placed on the first electrode layer and the second electrode layer such that the second electrode layer is located between the passivation layer and the first electrode layer; and a conformal layer on the second electrode layer and the passivation layer, wherein the first electrode layer includes a first hole, the second electrode layer includes a second hole, the passivation layer includes a third hole larger than the second hole, the first hole, second hole, and third hole overlap one another, one of the one or more first vias placed within the first hole, the second hole, and the third hole comprises an endcap in contact with the second electrode layer, the second electrode layer comprises an exposed region between the endcap and the passivation layer, and the conformal layer completely overlaps the exposed region of the second electrode layer.

Some examples of the disclosure are related to a method of sensing touch at a touch sensor panel, the method comprising: shielding noise using a first shielding electrode placed on a first electrode layer; sensing touch using one or more touch electrodes placed on a second electrode layer; shielding noise using a second shielding electrode placed on a third electrode layer; connecting, using one or more routing traces included in the second electrode layer, the one or more touch electrodes to one or more bond pad regions; electrically coupling, using one or more first vias placed in the one or more bond pad regions, the first electrode layer and the second electrode layer; electrically coupling, using one or more second vias placed outside the bond pad region, the first electrode layer and the third electrode layer; and driving the first, second, and third electrode layers to a same potential. Additionally or alternatively, in some examples, the method further includes sensing touch using touch sensing circuitry coupled to the one or more routing traces by way of one or more connections within the one or more bond pad regions. Additionally or alternatively, in some examples, the method further includes routing one or more signals from the one or more touch electrodes using the one or more routing traces coupled to the one or more touch electrodes, each routing trace comprising a first conductive portion in an inner region of the device and a second conductive portion in an outer region of the device, the outer region around the inner region, wherein: the first conductive portion has a lower conductivity than the second conductive portion, and the one or more second vias are located in the outer region. Additionally or alternatively, in some examples, the one or more routing traces comprises a first routing trace coupled to a first touch electrode, the first touch electrode is located a first distance from one of the one or more second vias, the first routing trace further comprises a third conductive portion, the one of the one or more second vias placed between a first metal portion and a second metal portion of the first routing trace, the first conductive portion of the first routing trace comprises a diverted portion connected to the second conductive portion and the third conductive portion such that the first routing trace is separated from the one of the one or more second vias by at least a threshold distance. Additionally or alternatively, in some examples, the first conductive portion includes ITO and the second conductive portion includes copper. Additionally or alternatively, in some examples, the one or more touch electrodes are placed within an inner region of the touch sensor panel, a first opaque mask is located around the inner region, the first opaque mask comprises one or more notches, and the one or more second vias are placed in the one or more notches of the first opaque mask. Additionally or alternatively, in some examples, the method further comprises covering, with a cover material overlapping the inner region and the first opaque mask, the first electrode layer, the second electrode layer, and the third electrode layer, wherein a second opaque mask is placed on the cover material, the second opaque mask having an interior edge and an exterior edge, the interior edge located further from the one or more touch electrodes than an interior edge of the first opaque mask. Additionally or alternatively, in some examples, the method further includes covering the first electrode layer and the second electrode layer with a passivation layer such that the first electrode layer is located between the passivation layer and the second electrode layer, wherein: the first electrode layer includes a first hole, the second electrode layer includes a second hole, the passivation layer includes a third hole larger than the first hole, the first hole, the second hole, and the third hole overlap one another, and one of the one or more first vias placed within the first hole, the second hole, and the third hole comprises an endcap in contact with the first electrode layer, the endcap overlapping a region of the first electrode layer exposed by the third hole in the passivation layer. Additionally or alternatively, in some examples, the method further includes covering the first electrode layer and the second electrode layer with a passivation layer such that the second electrode layer is between the passivation layer and the second electrode layer, wherein: the first electrode layer includes a first hole, the second electrode layer includes a second hole, the passivation layer includes a third hole larger than the second hole, the first hole, the second hole, and the third hole overlap one another, one of the one or more first vias placed within the first hole, the second hole, and the third hole comprises an endcap in contact with the second electrode layer, the second electrode layer comprises an exposed region between the endcap and the passivation layer, and a conformal layer placed on the second electrode layer and the passivation layer that overlaps the exposed region of the second electrode layer.

Some examples of the disclosure are related to a method of forming a touch sensor panel, the method comprising: forming a first shielding electrode on a first electrode layer; forming one or more touch electrodes on a second electrode layer; forming a second shielding electrode on a third electrode layer; forming one or more routing traces coupled to the one or more touch electrodes; forming a bond pad region comprising connections to the one or more routing traces, the connections in the bond pad region different from connections between the one or more routing traces and the one or more touch electrodes; forming, in the bond pad region, one or more first vias electrically coupling the first electrode layer and the second electrode layer; and forming one or more second vias electrically coupling the first electrode layer and the third electrode layer, wherein the second electrode layer is placed between the first electrode layer and the third electrode layer. Additionally or alternatively, in some examples, the one or more routing traces are coupled to touch sensing circuitry by way of the connections in the bond pad region. Additionally or alternatively, in some examples, each of the one or more routing traces comprises a first conductive portion in an inner region of the touch sensor panel and a second conductive portion in an outer region of the touch sensor panel, the outer region located around the inner region, wherein: the first conductive portion has a lower conductivity than the second conductive portion, and the one or more second vias are located in the outer region. Additionally or alternatively, in some examples, the one or more routing traces comprises a first routing trace coupled to a first touch electrode, the first touch electrode is a first distance from one of the one or more second vias, the first conductive portion of the first routing trace is longer than the first distance such that the first routing trace is separated from the one of the one or more second vias by at least a threshold distance. Additionally or alternatively, in some examples, the one or more routing traces comprises a first routing trace coupled to a first touch electrode, the first touch electrode is a first distance from one of the one or more second vias, the first routing trace further comprises third conductive portion, the one of the one or more second vias placed between the second conductive portion and the third conductive portion, the first conductive portion of the first routing trace comprises a diverted portion connected to the second conductive portion and the third conductive portion such that the first routing trace is separated from the one of the one or more second vias by at least a threshold distance. Additionally or alternatively, in some examples, the first conductive portion comprises ITO and the second conductive portion comprises copper. Additionally or alternatively, in some examples, the method further includes forming an inner region, the inner region including the one or more touch electrodes; forming a first opaque mask around the inner region, the first opaque mask comprising one or more recessed notches, wherein the one or more second vias are placed in the recessed notches of the first opaque mask. Additionally or alternatively, in some examples, the method further includes forming a cover material located on an opposite side of the first electrode layer than the second electrode layer; and forming a second opaque mask placed on the cover material, the second opaque mask having an interior edge and an exterior edge, the interior edge located further from the one or more touch electrodes than an interior edge of the first opaque mask. Additionally or alternatively, in some examples, the method further includes forming a passivation layer placed on the first electrode layer and second electrode layer such that the first electrode layer is between the passivation layer and the second electrode layer, wherein: the first electrode layer includes a first hole, the second electrode layer includes a second hole, the passivation layer includes a third hole larger than the first hole, the first hole, second hole, and third hole overlap one another, and at least one of the one or more first vias placed within the first hole, second hole and third hole comprises an endcap in contact with the first electrode layer, the endcap overlapping a region of the first electrode layer exposed by the third hole in the passivation layer. Additionally or alternatively, in some examples, the method further includes forming a passivation layer placed on the first electrode layer and the second electrode layer such that the second electrode layer is located between the passivation layer and the first electrode layer; and forming a conformal layer on the second electrode layer and the passivation layer, wherein: the first electrode layer includes a first hole, the second electrode layer includes a second hole, the passivation layer includes a third hole larger than the second hole, the first hole, second hole, and third hole overlap one another, one of the one or more first vias placed within the first hole, the second hole, and the third hole comprises an endcap in contact with the second electrode layer, the second electrode layer comprises an exposed region between the endcap and the passivation layer, and the conformal layer completely overlaps the exposed region of the second electrode layer.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:
1. A touch sensor panel comprising:
a first electrode layer comprising a first shielding electrode;
a second electrode layer comprising one or more touch electrodes coupled to one or more routing traces; a third electrode layer comprising a second shielding electrode;
a bond pad region comprising a plurality of connections to the one or more routing traces, the connections in the bond pad region different from connections between the one or more routing traces and the one or more touch electrodes;
a plurality of vias comprising:
one or more first vias electrically coupling the first electrode layer and the second electrode layer, the one or more first vias placed within the bond pad region; and
one or more second vias electrically coupling the first electrode layer and the third electrode layer, wherein the first electrode layer and the third electrode layer are disposed above and below the second electrode layer, respectively.
2. The touch sensor panel of claim 1, wherein the one or more routing traces are coupled to touch sensing circuitry by way of the connections in the bond pad region.
3. The touch sensor panel of claim 1, wherein:
each of the one or more routing traces comprises a first conductive portion in an inner region of the touch sensor panel and a second conductive portion in an outer region of the touch sensor panel, the outer region located around the inner region, wherein:
the first conductive portions have a lower conductivity than the second conductive portions, and
the one or more second vias are located in the outer region.
4. The touch sensor panel of claim 3, wherein:
the one or more routing traces comprises a first routing trace coupled to a first touch electrode,
the first touch electrode is a first distance from one of the one or more second vias,
the first conductive portion of the first routing trace is longer than the first distance such that the first routing trace is separated from the one of the one or more second vias by at least a threshold distance.
5. The touch sensor panel of claim 3, wherein:
the one or more routing traces comprises a first routing trace coupled to a first touch electrode,
the first touch electrode is a first distance from one of the one or more second vias, the first routing trace further comprises a third conductive portion, the one of the one or more second vias placed between the third conductive portion and the second conductive portion, the first conductive portion of the first routing trace comprises a diverted portion connected to the second conductive portion and the third conductive portion such that the first routing trace is separated from the one of the one or more second vias by at least a threshold distance.

6. The touch sensor panel of claim 3, wherein the first conductive portions include ITO and the second conductive portions include copper.

7. The touch sensor panel of claim 1, further comprising:
an inner region, the inner region including the one or more touch electrodes; and
a first opaque mask around the inner region, the first opaque mask comprising one or more notches, wherein the one or more second vias are placed in the one or more notches of the first opaque mask.

8. The touch sensor panel of claim 7, further comprising:
a cover material located on an opposite side of the first electrode layer than the second electrode layer; and
a second opaque mask placed on the cover material, the second opaque mask having an interior edge and an exterior edge, the interior edge located further from the one or more touch electrodes than an interior edge of the first opaque mask.

9. The touch sensor panel of claim 7, wherein:
one or more of the first electrode layer, the second electrode layer, and the third electrode layer include one or more tabs extending outward at radial locations of the touch sensor panel having the one or more notches of the first opaque mask.

10. The touch sensor panel of claim 1, further comprising:
a passivation layer placed on the first electrode layer and second electrode layer such that the first electrode layer is between the passivation layer and the second electrode layer, wherein:
the first electrode layer includes a first hole,
the second electrode layer includes a second hole,
the passivation layer includes a third hole larger than the first hole,
the first hole, second hole, and third hole overlap one another, and
at least one of the one or more first vias placed within the first hole, second hole, and third hole comprises an endcap in contact with the first electrode layer, the endcap overlapping a region of the first electrode layer exposed by the third hole in the passivation layer.

11. The touch sensor panel of claim 1, further comprising:
a passivation layer placed on the first electrode layer and the second electrode layer such that the second electrode layer is located between the passivation layer and the first electrode layer; and
a conformal layer on the second electrode layer and the passivation layer, wherein:
the first electrode layer includes a first hole,
the second electrode layer includes a second hole,
the passivation layer includes a third hole larger than the second hole,
the first hole, second hole, and third hole overlap one another,
one of the one or more first vias placed within the first hole, the second hole, and the third hole comprises an endcap in contact with the second electrode layer, the second electrode layer comprises an exposed region between the endcap and the passivation layer, and
the conformal layer completely overlaps the exposed region of the second electrode layer.

12. The touch sensor panel of claim 1, wherein:
the one or more second vias are oval vias having an extended structure in one dimension.

13. A method of sensing touch at a touch sensor panel, the method comprising:
shielding noise using a first shielding electrode placed on a first electrode layer;
sensing touch using one or more touch electrodes placed on a second electrode layer;
shielding noise using a second shielding electrode placed on a third electrode layer;
connecting, using one or more routing traces included in the second electrode layer, the one or more touch electrodes to one or more bond pad regions;
electrically coupling, using one or more first vias placed in the one or more bond pad regions, the first electrode layer and the second electrode layer;
electrically coupling, using one or more second vias placed outside the bond pad region, the first electrode layer and the third electrode layer; and
driving the first, second, and third electrode layers to a same potential,
wherein the first electrode layer and the third electrode layer are disposed above and below the second electrode layer, respectively.

14. The method of claim 13, further comprising:
sensing touch using touch sensing circuitry coupled to the one or more routing traces by way of one or more connections within the one or more bond pad regions.

15. The method of claim 13, further comprising:
routing one or more signals from the one or more touch electrodes using the one or more routing traces coupled to the one or more touch electrodes, each routing trace comprising a first conductive portion in an inner region of the touch sensor panel and a second conductive portion in an outer region of the touch sensor panel, the outer region around the inner region, wherein:
the first conductive portion has a lower conductivity than the second conductive portion, and
the one or more second vias are located in the outer region.

16. The method of claim 15, wherein:
the one or more routing traces comprises a first routing trace coupled to a first touch electrode,
the first touch electrode is located a first distance from one of the one or more second vias,
the first routing trace further comprises a third conductive portion, the one of the one or more second vias placed between a first metal portion and a second metal portion of the first routing trace,
the first conductive portion of the first routing trace comprises a diverted portion connected to the second conductive portion and the third conductive portion such that the first routing trace is separated from the one of the one or more second vias by at least a threshold distance.

17. The method of claim 15, wherein the first conductive portion includes ITO and the second conductive portion includes copper.

18. The method of claim 13, wherein:
the one or more touch electrodes are placed within an inner region of the touch sensor panel,
a first opaque mask is located around the inner region, the first opaque mask comprises one or more notches, and the one or more second vias are placed in the one or more notches of the first opaque mask.

19. The method of claim 18, further comprising:
covering, with a cover material overlapping the inner region and the first opaque mask, the first electrode layer, the second electrode layer, and the third electrode layer, wherein a second opaque mask is placed on the cover material, the second opaque mask having an interior edge and an exterior edge, the interior edge located further from the one or more touch electrodes than an interior edge of the first opaque mask.

20. The method of claim 13, further comprising:
covering the first electrode layer and the second electrode layer with a passivation layer such that the first electrode layer is located between the passivation layer and the second electrode layer, wherein:
the first electrode layer includes a first hole,
the second electrode layer includes a second hole,
the passivation layer includes a third hole larger than the first hole,
the first hole, the second hole, and the third hole overlap one another, and
one of the one or more first vias placed within the first hole, the second hole, and the third hole comprises an endcap in contact with the first electrode layer, the endcap overlapping a region of the first electrode layer exposed by the third hole in the passivation layer.

21. The method of claim 13, further comprising:
covering the first electrode layer and the second electrode layer with a passivation layer such that the second electrode layer is between the passivation layer and the second electrode layer, wherein:
the first electrode layer includes a first hole,
the second electrode layer includes a second hole,
the passivation layer includes a third hole larger than the second hole,
the first hole, the second hole, and the third hole overlap one another,
one of the one or more first vias placed within the first hole, the second hole, and the third hole comprises an endcap in contact with the second electrode layer,
the second electrode layer comprises an exposed region between the endcap and the passivation layer, and
a conformal layer placed on the second electrode layer and the passivation layer that overlaps the exposed region of the second electrode layer.

22. A method of forming a touch sensor panel, the method comprising:
forming a first shielding electrode on a first electrode layer; forming one or more touch electrodes on a second electrode layer;
forming a second shielding electrode on a third electrode layer;
forming one or more routing traces coupled to the one or more touch electrodes;
forming a bond pad region comprising connections to the one or more routing traces, the connections in the bond pad region different from connections between the one or more routing traces and the one or more touch electrodes;
forming, in the bond pad region, one or more first vias electrically coupling the first electrode layer and the second electrode layer; and
forming one or more second vias electrically coupling the first electrode layer and the third electrode layer, wherein the first electrode layer and the third electrode layer are disposed above and below the second electrode layer, respectively.

23. The method of claim 22, wherein the one or more routing traces are coupled to touch sensing circuitry by way of the connections in the bond pad region.

24. The method of claim 22, wherein:
each of the one or more routing traces comprises a first conductive portion in an inner region of the touch sensor panel and a second conductive portion in an outer region of the touch sensor panel, the outer region located around the inner region, wherein:
the first conductive portion has a lower conductivity than the second conductive portion, and
the one or more second vias are located in the outer region.

25. The method of claim 24, wherein:
the one or more routing traces comprises a first routing trace coupled to a first touch electrode,
the first touch electrode is a first distance from one of the one or more second vias,
the first conductive portion of the first routing trace is longer than the first distance such that the first routing trace is separated from the one of the one or more second vias by at least a threshold distance.

26. The method of claim 24, wherein:
the one or more routing traces comprises a first routing trace coupled to a first touch electrode,
the first touch electrode is a first distance from one of the one or more second vias,
the first routing trace further comprises third conductive portion, the one of the one or more second vias placed between the second conductive portion and the third conductive portion,
the first conductive portion of the first routing trace comprises a diverted portion connected to the second conductive portion and the third conductive portion such that the first routing trace is separated from the one of the one or more second vias by at least a threshold distance.

27. The method of claim 26, wherein the first conductive portion comprises ITO and the second conductive portion comprises copper.

28. The method of claim 22, further comprising:
forming an inner region, the inner region including the one or more touch electrodes;
forming a first opaque mask around the inner region, the first opaque mask comprising one or more recessed notches, wherein the one or more second vias are placed in the recessed notches of the first opaque mask.

29. The method of claim 28, further comprising:
forming a cover material located on an opposite side of the first electrode layer than the second electrode layer; and
forming a second opaque mask placed on the cover material, the second opaque mask having an interior edge and an exterior edge, the interior edge located further from the one or more touch electrodes than an interior edge of the first opaque mask.

30. The method of claim 22, further comprising:
forming a passivation layer placed on the first electrode layer and second electrode layer such that the first electrode layer is between the passivation layer and the second electrode layer, wherein:
the first electrode layer includes a first hole,
the second electrode layer includes a second hole, the passivation layer includes a third hole larger than the first hole, the first hole, second hole, and third hole overlap one another, and at least one of the one or more first vias placed within the first hole, second hole and third hole comprises an endcap in contact with the first electrode layer, the endcap overlapping a region of the first electrode layer exposed by the third hole in the passivation layer.

31. The method of claim 22, further comprising:

forming a passivation layer placed on the first electrode layer and the second electrode layer such that the second electrode layer is located between the passivation layer and the first electrode layer; and forming a conformal layer on the second electrode layer and the passivation layer, wherein:

the first electrode layer includes a first hole, the second electrode layer includes a second hole, the passivation layer includes a third hole larger than the second hole, the first hole, second hole, and third hole overlap one another, one of the one or more first vias placed within the first hole, the second hole, and the third hole comprises an endcap in contact with the second electrode layer, the second electrode layer comprises an exposed region between the endcap and the passivation layer, and the conformal layer completely overlaps the exposed region of the second electrode layer.

* * * * *